(12) United States Patent
Kortesalmi et al.

(10) Patent No.: US 12,583,272 B2
(45) Date of Patent: Mar. 24, 2026

(54) SYSTEM FOR MOVING A WORK MACHINE

(71) Applicant: SLEIPNER FINLAND OY, Jyväskylä (FI)

(72) Inventors: Ossi Kortesalmi, Jyväskylä (FI); Joona Miettinen, Jyväskylä (FI)

(73) Assignee: Sleipner Group Oy, Jyväskylä (FI)

( * ) Notice: Subject to any disclaimer, the term of this patent is extended or adjusted under 35 U.S.C. 154(b) by 347 days.

(21) Appl. No.: 18/027,678

(22) PCT Filed: Sep. 22, 2021

(86) PCT No.: PCT/FI2021/050622
§ 371 (c)(1),
(2) Date: Mar. 22, 2023

(87) PCT Pub. No.: WO2022/064104
PCT Pub. Date: Mar. 31, 2022

(65) Prior Publication Data
US 2023/0382171 A1 Nov. 30, 2023

(30) Foreign Application Priority Data
Sep. 22, 2020 (FI) ..................................... 20205918

(51) Int. Cl.
B60D 1/46 (2006.01)
B60P 1/02 (2006.01)
(Continued)

(52) U.S. Cl.
CPC .............. B60D 1/465 (2013.01); B60P 1/027 (2013.01); B60P 3/062 (2013.01); B60P 3/064 (2013.01); E02F 9/003 (2013.01)

(58) Field of Classification Search
CPC .......... B60D 1/465; B60P 1/027; B60P 3/062; B60P 3/064; E02F 9/003
See application file for complete search history.

(56) References Cited

U.S. PATENT DOCUMENTS

| | | | |
|---|---|---|---|
| 4,200,315 A | 4/1980 | Carlsson | |
| 2003/0042705 A1* | 3/2003 | French | B62D 53/065 280/441.2 |
| 2004/0060715 A1* | 4/2004 | Hoelscher | B60D 1/02 172/272 |

FOREIGN PATENT DOCUMENTS

| | | |
|---|---|---|
| DE | 2845801 A1 | 4/1979 |
| GB | 731476 A | 6/1955 |

(Continued)

OTHER PUBLICATIONS

International Search Report in corresponding International Patent Application No. PCT/FI2021/050622, mailed Jan. 28, 2022, 3 pages.

(Continued)

*Primary Examiner* — Dany E Akakpo
(74) *Attorney, Agent, or Firm* — FisherBroyles, LLP; Robert Kinberg

(57) ABSTRACT

A system for moving a work machine includes a towing vehicle, a trailer arranged to be towed with the towing vehicle, and a towing arrangement for the towing vehicle. The towing vehicle includes a towing vehicle's towing point arranged under its chassis between the front axle and rear axle. The trailer includes a chassis and a towing arm, a deck, and wheels. The towing arrangement includes: a drawbar having a first end pivoted to the towing vehicle's towing point and a second end having a drawbar's towing point for the trailer to be towed, a first pivot under the rear axle and in a transverse direction of the vehicle chassis for pivoting the drawbar to the towing vehicle's towing point, a second pivot having a vertical axis and being fitted to the drawbar's second end to transmit a load of the trailer being towed rigidly to the first pivot, a third pivot, located at one end of the drawbar, to permit the trailer to tilt in a transverse direction of the towing vehicle, a vertical support for the (Continued)

second pivot, an upper drawbar, and a connector arm, wherein the drawbar, the upper drawbar, and the connector arm form a closed structure around the rear axle.

8 Claims, 24 Drawing Sheets

(51) Int. Cl.
    *B60P 3/06*          (2006.01)
    *E02F 9/00*          (2006.01)

(56)            References Cited

FOREIGN PATENT DOCUMENTS

| | | |
|---|---|---|
| GB | 1306443 A | 2/1973 |
| JP | 02-203710 A | 8/1990 |
| NL | 8100145 A | 8/1982 |
| SU | 1414662 A1 | 8/1988 |
| WO | 2015025077 A1 | 2/2015 |

OTHER PUBLICATIONS

International Preliminary Report on Patentability in corresponding International Patent Application No. PCT/ FI2021/050622, date of completion Dec. 12, 2022, 26 pages.
Japanese Office Action in corresponding Patent Application No. 2023-517714, dated Aug. 19, 2025, 5 pages.

\* cited by examiner

Prior Art

Prior Art

SECTION F-F

SECTION C-C

SYSTEM FOR MOVING A WORK MACHINE

CROSS REFERENCE TO RELATED APPLICATIONS

This application claims benefit of priority from International Patent Application No: PCT/FI2021/050622 filed Sep. 22, 2021, which claims benefit of Finland Patent Application No. 20205918 filed Sep. 22, 2020.

Field of the Invention

The invention relates to a towing arrangement for a towing vehicle, the towing vehicle comprising a chassis, a front axle, with front wheels, and a rear axle, with rear wheels, fitted to the chassis at a distance from each other, as well as the towing vehicle's towing point fitted to the chassis or in connection with the chassis between the front axle and the rear axle, which towing arrangement includes—a drawbar comprising a first end arranged to be pivoted to the towing vehicle's towing point and a second end, in which second end the drawbar's towing point for the device to be towed is formed, in which the drawbar is arranged essentially parallel to the towing vehicle's chassis and extends in the case of the second end behind the towing vehicle's rear axle. The invention also relates to a system for moving a work machine equipped with a crawler-tracked chassis or a wheeled chassis, a trailer, and a method.

Background of the Invention

In mines and quarries, heavy work machines equipped with crawler-track chassis or wheeled chassis are moved mainly with the aid of trailers, to prevent wear in the crawler-track chassis and to accelerate moving. Because the work machines are often large and heavy, for example with a weight of 120 tn, the trailers are often quite long.

A trailer is known from publication WO 2015/025077 A1, which is generally towed using a chassis-steered towing vehicle, i.e. a dumper. The trailer is attached to a towing point on top of the dumper's chassis, with the aid of a towing arm known as a gooseneck. The trailer forms a long rigid totality, which is relatively easy to turn with the aid of a chassis-steered dumper. Here the towing point has degrees of freedom for turning the trailer in all three directions.

However, on many work sites trailers are towed with the aid of a towing vehicle with a rigid chassis and steered only with the aid of its front wheels, preferably an earth-moving vehicle. Generally, earth-moving vehicles are used to move earth, but, if the tipper body and the tipping cylinders operating it are removed, the trailer can be attached with the aid of a gooseneck to the earth-moving vehicle's towing point in front of the rear axle, formed above the earth-moving vehicle's chassis. FIGS. 1 and 3a show the attachment, according to the prior art, with the aid of a gooseneck 110, of a trailer 56' to a towing point 24 above the towing vehicle's 12 chassis 14. In the towing point, the gooseneck's 110 towing head can rotate around all three axes. In a known manner, there is a sphere in the towing point, to which the towing head's spherical surface fits. When using a rigid-chassis towing vehicle 12, the towing point 24 is formed at a considerable height above the support point p of FIG. 3a. When towing a rigid trailer 56' the totality becomes, however, significantly slow to turn, as the towing vehicle's 12 turning radius is large and the trailer's 56' length 11 quite long. In other words, the wheel-span between the towing vehicle and the trailer's swing bogie's axle is large.

In this context, the term a rigid towing vehicle refers to a towing vehicle, in which there is a rigid chassis without chassis steering, steering taking place only by turning the front wheels and the rear axle is preferably driven. There can be one or more rear axles in the towing vehicle, such as, for example, in Haulmax 3900-series earth-moving vehicles.

Another problem relates to the towing point 24 formed on top of the chassis 14 of the towing vehicle 12 according to FIG. 3a. The towing point 24 is located on top of the chassis 14 quite high from the ground surface 200, which acts as a support point p for the towing vehicle and particularly for the towing vehicle's rear wheels 22. When the trailer 56' and the heavy work machine (not shown) transported on it are towed, a horizontal force $V_1$, which runs over the rear axle 20 through the trailer's 56' gooseneck 110, acts backwards on the towing point 24 of the towing vehicle 12 from the trailer 56' being towed. As the towing vehicle's 12 rear wheels 22 act as a support point, from which the traction force $V_2$, created by the towing vehicle's engine, is transmitted forwards, and the towing point 24 is high above the surface of the ground, a large lever arm is created for the force $V_1$, which seeks to rotate the towing vehicle 12 around the support point p. Only the gravity G acting on the towing vehicle's 12 own mass G seeks to cancel this moment. With heavy loads, and particularly when going uphill, the force $V_1$ can make the towing vehicle's 12 front wheels 18 rise from the ground and in that way cause a loss of steerability and control. For this reason, when transporting heavy loads additional weights 63 attached to their fronts have to be used in towing vehicles 12, which prevents the towing vehicle's 12 front wheels 18 from rising off the ground 200, but at the same time increases the combination's total mass and therefore the loading acting on the towing vehicle 12, and its fuel consumptions. The additional weights reduce the useful load of the total weight of the combination. The size of the additional weight can be, for example, 20-50 tn, depending on the size of the towing vehicle.

SUMMARY OF THE INVENTION

The invention is intended to create a system, which permits the device being towed to be towed more easily and safely than by solutions of the prior art. The present invention is characterized by a system for moving a work machine equipped with a crawler chassis or a wheeled chassis, the system comprising a towing vehicle, a trailer arranged to be towed with the towing vehicle, and a towing arrangement for the towing vehicle, the towing vehicle comprising a chassis, a front axle with front wheels and a rear axle with rear wheels, arranged in the chassis at a distance from each other, as well as a towing vehicle's towing point arranged under the chassis between the front axle and rear axle, the trailer comprising a chassis of the trailer comprising sides, a towing end and a loading end, as well as a towing arm at the towing end to attach the towing arm to the towing vehicle's towing point, an essentially level deck comprising a front end and a rear end, fitted on top of the trailer's chassis, and wheels fitted on both side of the trailer's chassis at sides of the deck. The towing arrangement according to the invention includes a drawbar comprising a first end arranged to be pivoted to the towing point and a second end, on which second end the drawbar's towing point is formed for the device to be towed, in which the drawbar is arranged essentially parallel to the towing vehicle's chassis and extends, in the case of the second end behind the towing vehicle's rear axle. More specifically, according to the invention the aforementioned towing point's sphere and spherical surface are "stretched"

in the drawbar's length and the degrees of freedom of the three axes are divided separately into their own pivots on each side of the rear axle, each of which pivot carries the moment in a plane defined by its axis of rotation.

The drawbar is arranged to be pivoted, on a first pivot transversely to the chassis, essentially horizontally to run under the rear axle to the towing vehicle's towing point. The second pivot transmitting the moment in a vertical plane is arranged to transmit the load of the device being towed, in the drawbar's towing point, rigidly to the first pivot and through it to the towing vehicle's chassis.

The towing arrangement includes a third pivot equipped with a shaft in the towing vehicle's longitudinal direction, thus permitting the device and the drawbar to tilt in the towing vehicle's transverse direction.

The towing arm is rigidly attached to the drawbar's rearmost pivot. In this context, the term rearmost pivot preferably refers to the second or third pivot, which is located closer to the second end of the drawbar and which forms the drawbar's towing point.

By means of the towing arrangement according to the invention, a horizontal and backwardly-directed force, caused by the device being towed or the towing vehicle, is made to act, relative to the rear axle, nearly essentially to its line or under the rear axle, so that the towing force tends to press the front of the towing vehicle towards the ground surface, and not to lift it off the ground surface, as is the case in towing arrangements of the prior art. On the other hand, the towing-arm weight of the device being towed, or of the towing vehicle, is transmitted through the towing arrangement to the towing vehicle's towing point, which is located between the front and rear axles and below the chassis. The weight of the device being towed, or of the towing vehicle, then also tends to press the towing vehicle's front tyres onto the ground, thus preventing the towing vehicle's front tyres from rising into the air. On the other hand, in this way a sufficient load is also directed to the towing vehicle's rear tyres, so that the driving rear tyres have sufficient weight to ensure the required traction grip. With the aid of the towing arrangement according to the invention, the degrees of freedom of the movement of the device being towed are separated into three separate pivots essentially at the ends of the drawbar, in which each pivot forwards moments with other directions.

In each pivot there are preferably two halves, which rotate relative to each other, and the towing arm is attached to one side of the pivot while the drawbar is attached to the opposite side directly or through one separate pivot.

The towing arm is preferably attached to a third pivot. The torsion caused by the ground's unevenness then act only on the third pivot and no longer on the second pivot.

In this context, references to a towable device mean preferably a trailer, or semi-trailer, equipped with a towing arm, which is rigidly attached to a single-axis second or third pivot. Alternatively, the term towable device can also refer to a second towable vehicle, preferably an earth-moving vehicle.

The towing point is preferably located beneath an axle line running between the front and rear axles.

According to a first embodiment, the towing arrangement includes, in addition, a support arm comprising an attachment end arranged to be attached the vehicle's chassis and a support end arranged to support the drawbar in the towing vehicle's transverse direction. With the aid of the support arm the drawbar's transverse forces on the towing vehicle's chassis are received, so that the drawbar's structure can be lightened.

In a first embodiment, the drawbar can be formed of two parallel arms, which are joined together at both the first and second ends of the drawbar and the support arm can be arranged, at the support end, between the arms, to support them transversely at least at times, and to permit the drawbar to rotate relative to the first pivot. In other words, the support arm's support end supports the drawbar's arms from its inner surfaces only when the drawbar bends due to a transverse loading. Such a structure permits the drawbar to rotate relative to the first pivot and the height adjustment of the drawbar's second end, which is important especially when towing another earth-moving vehicle. On the other hand, the drawbar should be free to rotate around the first pivot at its first end, so that the towing vehicle and the device being towed can conform to the ground-form, without the towing arrangement seeking to twist the towing vehicle into the air.

In the first embodiment, the towing arrangement preferably further includes a transverse arm, pivoted to the towing vehicle's towing point with the aid of the first pivot, and the towing arm is pivoted in the towing vehicle's longitudinal direction, with the aid of the essentially horizontal third pivot, the transverse arm permitting the second pivot to tilt in the towing vehicle's transverse direction. With the aid of the third pivot, the device being towed can tilt relative to its longitudinal axis, thus conforming to the ground-form and reducing the strains acting on the second pivot.

Thus, in all embodiments three pivots are advantageously formed in the towing arrangement according to the invention, permitting the device being towed to tilt in the vertical, longitudinal, and transverse directions.

According to the first embodiment, the towing arrangement can further include a chassis support, connected to the support arm's attachment head, which is arranged to be attached on top of the towing vehicle's chassis. The support arm is then securely locked to the towing vehicle's chassis and, on the other hand, it is possible to secure the chassis support through the towing vehicle's chassis again in connection with the first pivot, so that the towing arrangement will form a closed frame-like structure locked around the chassis. Such a frame-like structure is extremely strong and effectively transmits forces to the towing vehicle's chassis.

In the first embodiment, the support arm's support head can include wearing surfaces arranged to drag on the inner surfaces of the drawbar's arms at least at times, to support the drawbar in the towing vehicle's transverse direction. Implemented with the aid of the wearing surfaces, the towing vehicle's transverse support is simple and cheap to implement, compared to various pivot mechanisms or similar.

Instead of wearing surfaces, rollers with bearings can be fitted to the support arm's support head, with the aid of which the support arm is supported on the drawbar's arms' innner surfaces. Such a construction is, however, more complicated to implement.

According to a first implementation, in the first embodiment the traction created by the towing vehicle can be transmitted to the trailer using only the drawbar. The structure of the towing arrangement is then as simple as possible.

According to a second preferred embodiment, the towing arrangement includes in addition a vertical support, in connection with which the second pivot is formed and to which the drawbar connects, as well as an upper drawbar comprising two ends attached at one end to the vertical support and at the other end to the towing vehicle's chassis. When using the upper drawbar, the drawbar going under the towing vehicle's rear axle can considerably lighter in construction than when implemented without the upper drawbar.

The towing arrangement preferably further includes a connector arm, with the aid of which the upper drawbar connects to the towing vehicle's towing point by running over the rear axle, and the drawbar, the upper drawbar, and the connector arm form a closed annular structure around the rear axle. Such a closed annular structure is extremely rigid and can be implemented as a quite lightly constructed totality.

The third pivot is preferably formed in a vertical support behind the towing vehicle's rear axle. The towing vehicle's height does not then restrict the structure of the third pivot and it can designed more freely.

The towing arrangement can include a lifting cylinder fitted to the second end of the drawbar and between the support arm or upper drawbar, in order to adjust the height of the drawbar's second end. The use of the lifting cylinder is particularly advantageous when towing another earth-moving vehicle, when the other earth-moving vehicle's front wheels can be lifted into the air with the aid of a towing attachment installed on the drawbar or a suitable adapter, in order to improve the controllability of the other earth-moving vehicle.

The lifting cylinder can also be used to transfer more loading from the device being towed, preferably a trailer, to the towing vehicle's rear axle in a situation in which greater traction is needed in the vehicle's driven rear axle, for example, in slippery conditions.

The drawbar is preferably of such a length that, when connected to the vehicle, it extends farther behind the vehicle than the vehicle's chassis, when the vertical pivot is formed behind the vehicle. This permits greater turning of the towing arrangement, without the drawbar catching on the inner edges of the vehicle's rear wheels.

The towing arrangement is preferably supported on the ground only through the towing vehicle. The towing arrangement's deadweight then remains reasonable, the weight of the towing arrangement and of at least part of the device being towed attached to it acting on the vehicle's rear wheels, thus increasing their grip. In addition, implemented in this way the towing arrangement's overall length can be quite short, thus not increasing the overall length of the combination of the vehicle and device to be towed coupled to it.

The intention of the arrangement according to the invention can be achieved by using the arrangement for moving a work machine equipped with crawler chassis or a wheeled chassis, which includes a towing vehicle, a trailer arranged to be towed with the aid of a towing vehicle, and a towing arrangement for the towing vehicle. The towing vehicle includes a chassis, a front axle, with front wheels, and a rear axle, with rear wheels, arranged at a distance from each other in the chassis, as well as the towing vehicle's towing point fitted beneath the chassis between the front and rear axles. The trailer includes the trailer's chassis, comprising a towing end and a loading end, as well as a towing arm at the towing end for coupling the trailer to the towing vehicle's towing point, an essentially level deck comprising a front end and a loading end arranged on top of the trailer's chassis, and wheels fitted on both sides of the trailer's chassis at the sides of the deck. The towing arrangement includes a drawbar comprising a first end arranged to be pivoted on the towing vehicle's towing point and a second end, in which the drawbar's towing point for the trailer being towed is formed in the second end. The drawbar is arranged parallel to the towing vehicle's chassis and extends, in the case of the second end, behind the towing vehicle's rear axle. The towing arrangement includes, in addition, a first pivot for pivoting the drawbar to the towing vehicle's towing point formed below the towing vehicle's chassis under the rear axle, which first pivot is transverse to the chassis, a second pivot arranged at the second end of the drawbar, which second pivot is vertical and arranged to transmit the load of the trailer to be towed rigidly to the first pivot, and a third pivot located at one end of the drawbar, equipped with a shaft in the towing vehicle's longitudinal direction, thus permitting the device to tilt in the towing vehicle's transverse direction. The towing arm is rigidly coupled to the drawbar's rear pivot.

A crawler-chassis or wheeled-chassis work machine can be rapidly and efficiently transferred from one place to another, by means of the arrangement according to the invention. In the arrangement, the work machine's weight acts on the towing vehicle in such a way that it does not tend to lift the towing vehicle's front wheels off the ground, but tends to press them onto the ground. The towing machine's steerability is then retained in all situations and, on the other hand, the work machine's weight also provides additional weight for the towing vehicle's rear wheels and through it additional grip. On the other hand, in the arrangement the vertical pivot point between the trailer and the towing vehicle is formed to the rear of the towing vehicle, so that the trailer's rigid overall dimension shortens and the combination turns better. Use of the invention also achieves the advantage that the pivot point moves closer to the centre of the combination, so that the combination of the towing vehicle and the trailer or the towing vehicle and the earth-moving vehicle turns better and the trailer or earthmoving vehicle being towed follows more closely in the same tracks as the towing vehicle.

In the case of the towing arrangement of the system according to the invention, it is advantageous to use all of the aforementioned embodiments, and their features, of the towing arrangement according to the invention.

The towing vehicle is preferably an earth-moving vehicle, which includes tipping-cylinder lugs, which attach to the under side of the chassis and the earth-moving vehicle's towing point is formed in the tipping-cylinders' lugs. A separate towing point need not then be formed in the earth-moving vehicle's chassis, instead the already existing, extremely durable tipping-cylinder lugs can be used without structural alterations to the earth-moving vehicle. The tipping-cylinders' lugs are otherwise unused when using the earth-moving vehicle as a towing vehicle, when the tipping cylinders and tipping body are removed from use and detached from the earth-moving vehicle.

The earth-moving vehicle preferably includes pivot points for the tipping body, which are located in the chassis, and the support arm's attachment end or the upper towing arm is attached to the tipping body's pivot points. Again it is possible to use the earth-moving vehicle's existing structures to support the towing arrangement securely on the earth-moving vehicle, without requiring structural changes in the earthmoving vehicle.

Alternatively, the towing point can also be formed in a sub-frame attached to the towing vehicle's chassis. The subframe can be attached to the towing vehicle's chassis's upper or lower surface, or to both. Thus a sturdy towing point is obtained, the durability of which can be greater than that of the tipping-cylinder lugs.

According to one embodiment the trailer includes, in addition, swing bogies for attaching the wheels to the chassis, which swing bogies are arranged on both sides of the trailer's chassis at the sides of the deck, and each of the trailer's swing bogies includes an eccentric arm, comprising a first end pivoted to the trailer's chassis and a second end, an operating device pivoted at its first end to the chassis and from its second end to between the eccentric arm's first and second ends, as well as a swing arm pivoted to the eccentric arm's second arm, comprising two ends, on each of which ends one of the said wheels is mounted in bearings. The eccentric arm is arranged to lower the deck's loading end to the ground, while the front end remains essentially in place. Thus, the loading of a heavy work machine onto the trailer can be performed safely and in a controlled manner, as the deck does not form an angle between two different levels, i.e. a so-called threshold, over which the work machine tilts uncontrollably when being loaded. The deck can now be completely level, so that the work machine's loading is a controlled event taking place over a slight incline, in which the work machine is supported on at least two support points for the entire loading. Thanks to the construction described above, the arrangement is particularly suited to the transfer of heavy 40-250-tn, preferably 80-120-tn work machines with a crawler chassis or a wheeled chassis.

Alternatively, the swing bogies on each side of the trailer can include only one wheel mounted in bearings directly at the end of the eccentric arm, instead of on a swing arm. Such an implementation is suitable for use for transporting smaller work machines of preferably less than 50-tn.

The second pivot can be formed from a towing pin attached to the device to be towed, which has slide-bearing surfaces equipped with two different diameters and guide surfaces with changing diameters between them, as well as a towing sleeve formed at the end of the drawbar, the shape of the inner surface of which corresponds to that of the towing pin. Thanks to the construction of such a second pivot, the trailer's attachment to the towing arrangement is rapid and simple, as the guide surfaces guide the towing pin smoothly into the towing sleeve, even though there might be a small angle deviation between them. Nevertheless, the second pivot is essentially without a tolerance and withstands the loadings acting on it, transmitting the weight of the work machine and trailer to the towing vehicle's chassis through the towing arrangement.

The towing pin's two diameters are preferably such that the smaller diameter is closer to the pin's point. Thus, the towing pin can be easily fitted inside the towing sleeve.

In the system, the drawbar is preferably below the rear axle between the rear wheels. The towing arrangement does not then take up space from the sides of the towing vehicle.

The towing vehicle used in the system is preferably equipped with a rigid chassis and steerable front wheels.

The trailer's entire towing-arm weight acts advantageously on the towing vehicle. Thus, the vehicle's rear wheels' grip can be increased by providing them with additional weight.

There is preferably a non-pivoted chassis in the towing vehicle. The system according to the invention is particularly advantageous in connection with such a towing vehicle, as the turning circle of a towing vehicle with a non-pivoted chassis is considerably larger than that of one with a centre pivot. On the other hand, there are a considerable number of towing vehicles with a non-pivoted chassis in use, so that, for example, at a mine vehicles unused at the time can be utilized instead of dumpers.

The towing arrangement preferably also has an upper drawbar supporting the drawbar from above the towing vehicle's chassis.

With the aid of the trailer of the system according to the invention, a work machine with a crawler chassis or a wheeled chassis can be transferred safely and smoothly using a towing vehicle with a rigid chassis. The trailer attaches to the towing vehicle with the aid a towing arrangement, so that the length of the trailer's rigid part can be shorter than structures of the prior art, as the towing arrangement's second pivot will be behind the towing vehicle.

According to one embodiment, the trailer includes in addition swing bogies for attaching the said wheels to the chassis, which swing bogies are arranged on both sides of the trailer's chassis at the side of the deck, and each of the trailer's swing bogies includes an eccentric arm comprising a first end pivoted to the trailer's chassis and a second end, an operating device pivoted at its first end to the trailer's chassis and at its second end to between the first and second ends of the eccentric arm, as well as a swing arm, pivoted to the eccentric arm's second end, comprising two ends, to each of which one said wheel is mounted in bearings. The eccentric arm is arranged to lower the deck to the ground at the loading end while remaining essentially in place at the front end. Thus a heavy work machine can be loaded onto the trailer safely and in a controlled manner, as the deck does not form an angle between two different levels, i.e. a so-called threshold, over which the work machine tilts uncontrollably in loading. Now the deck can be completely level, so that the work machine's loading is a controlled event taking place on a slight incline, where the work machine is supported by at least two support points on the deck for the entire loading.

The second pivot can be formed from a towing pin attached to the device to be towed, which has slide-bearing surfaces with two different diameters and between them guide surfaces with changing diameters, as well as a towing sleeve formed at the end of the drawbar, which has an inner surface shaped to correspond to that of the towing pin. Thanks to the construction of such a second pivot, the trailer's attachment to the towing arrangement is rapid and simple, as the guide surfaces guide the towing pin smoothly into the towing sleeve, even though there can be a small angle deviation between them. Nevertheless the second pivot is essentially without a tolerance and withstands the loadings acting on it, transmitting the weight of the work machine and trailer to the towing vehicle's chassis through the towing arrangement.

The swing bogies can be attached to the trailer's chassis at a point situated at a distance from the trailer's chassis's loading end, which distance is 10-40%, preferably 18-30% of the trailer's total length between the towing end and the loading end. A sufficiently large downwardly acting load will then act on the towing vehicle's towing point through the trailer's towing arm, to ensure a sufficient traction grip for the towing vehicle's rear wheels.

In the trailer of the system according to the invention, a drag brake can be used, i.e. a wear-resistant brake surface attached to the undersurface of the trailer's deck, which, using the eccentric arm, can be lowered to drag continuously on the ground during transfers. Thus the towing vehicle's brakes' capacity can be quite small, as a continuous braking effect is created by the drag brake, so that the transfer demands continuous traction. Thus brake overheating or failure are not problems.

The trailer of the system according to the invention can transfer 40-250-tn, preferably 80-120-tn work machines with a crawler chassis or a wheeled chassis. The diameter of the trailer's wheels is then preferably 1400-2200 mm.

The towing arm preferably includes attachment means for attaching the trailer rigidly to the second or third pivot, thus permitting only movement taking place around the rotation axis of the relevant pivot.

According to one embodiment the attachment means are a towing pin. Thus, the trailer can include the second side of the second pivot in the form of a towing pin.

Alternatively, instead of a towing pin the attachment means can be a sleeve, which is arranged to receive the third pivot's pivot shaft.

The third pivot is preferably between the towing arm and the second pivot.

BRIEF DESCRIPTION OF THE DRAWINGS

In the following, the invention is described in detail with reference to the accompanying drawings showing some embodiments of the invention, in which.

DETAILED DESCRIPTION OF THE INVENTION

Figure 1:
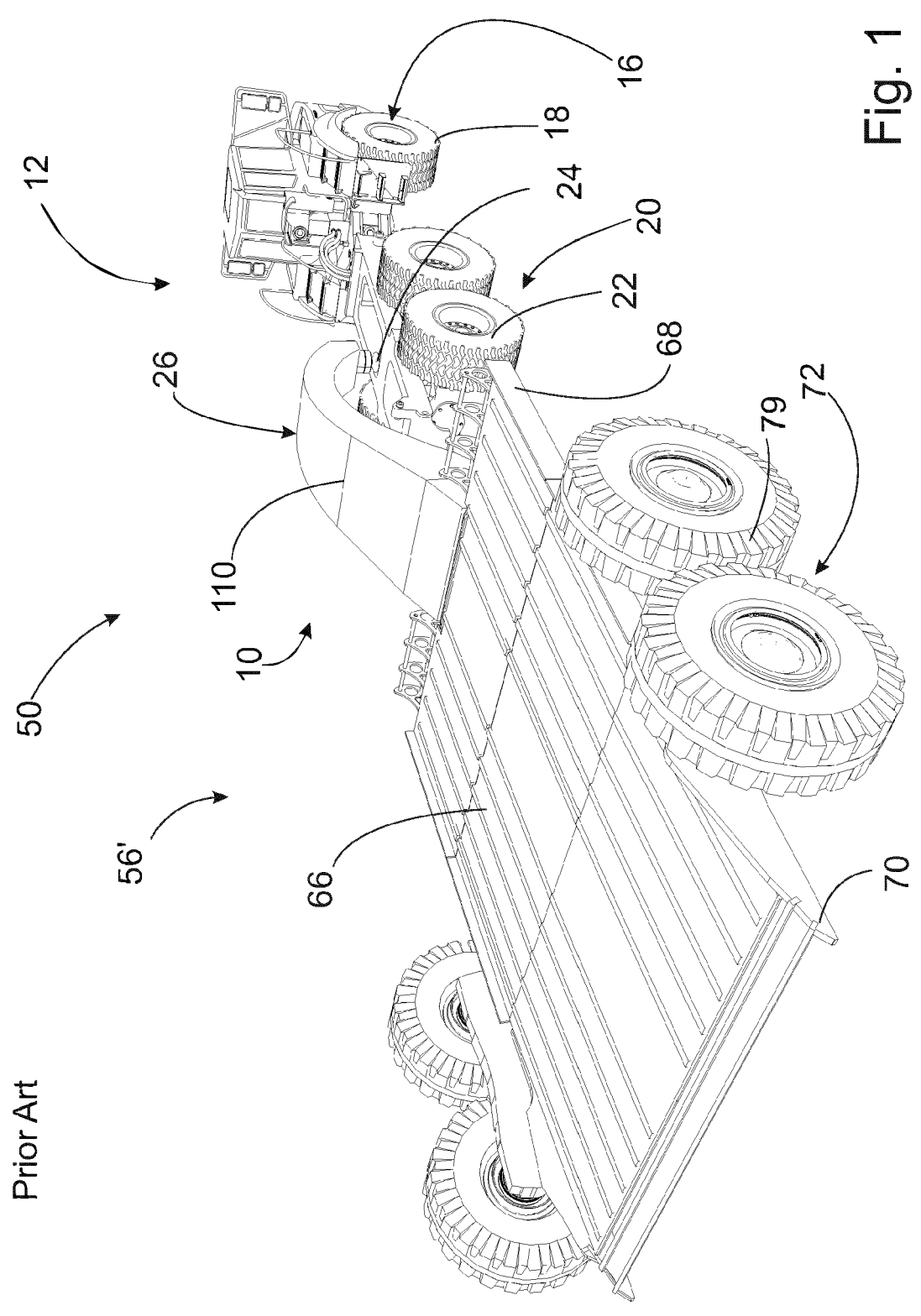
FIG. 1 shows an axonometric view of the system and trailer according to the prior art.
Figure 2:
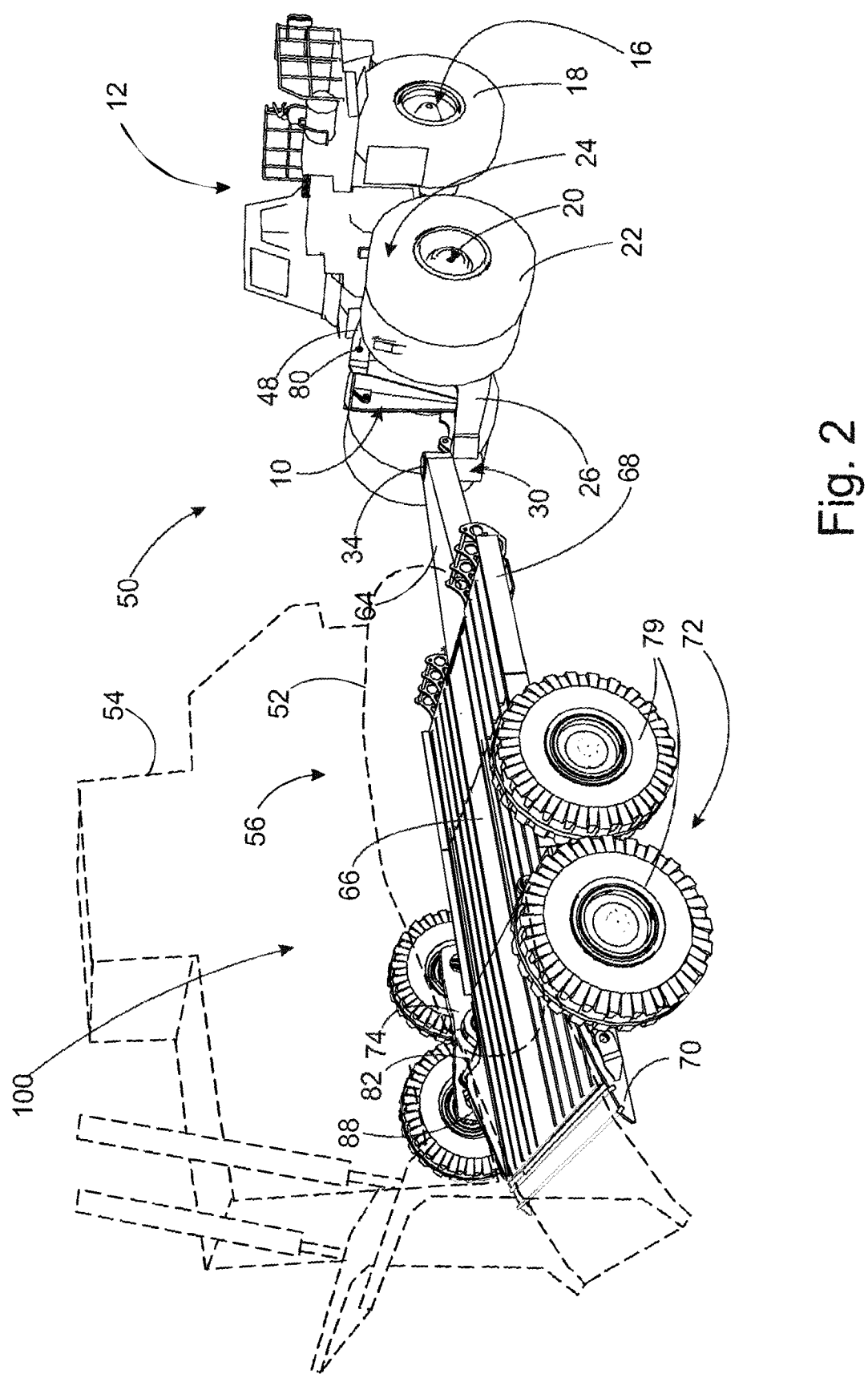
FIG. 2 shows an axonometric view of a first embodiment of the system and trailer according to the invention.

According to FIG. 2, the system 50 according to the invention is formed from a towing vehicle 12 according to the prior art, a towing arrangement 10 coupled it, and a device 100 to be towed, coupled to the towing arrangement 10, which in this case is a trailer 56, on top of which is preferably arranged a work machine 54 equipped with a crawler chassis 52. Alternatively, the work machine can be equipped with a wheeled chassis, but the transfer using a crawler chassis of work machines with crawler chassis is generally more wearing and slower. Thus, the invention is particularly well suited to the transfer of work machines with crawler chassis.

Figure 7A:
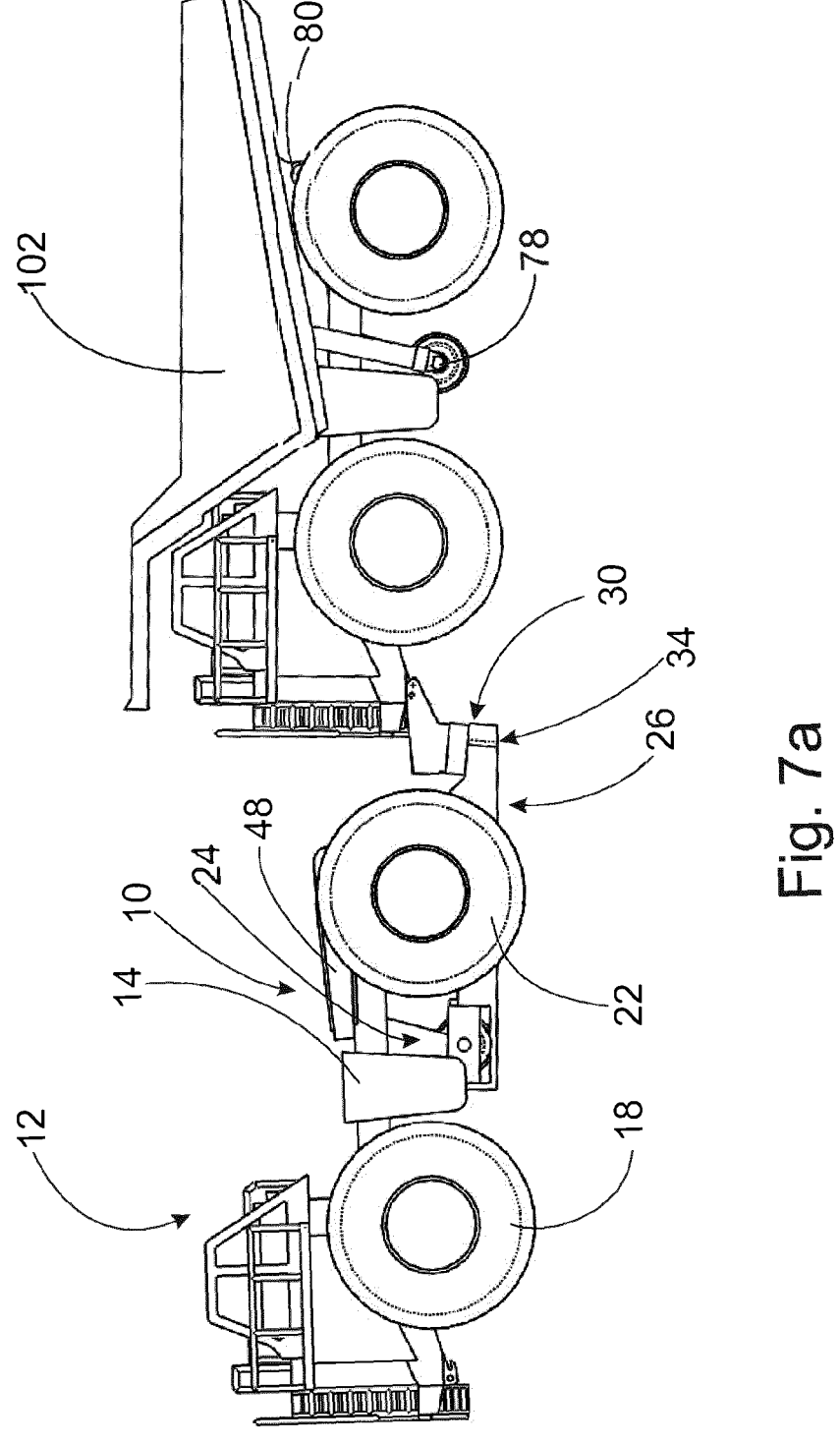
FIGS. 7a and 7b show the transportation of another earthmoving vehicle with the aid of a first embodiment of the towing arrangement of the system according to the invention.

The towing arrangement of the system according to the invention is preferably used in connection with an earthmoving vehicle acting as a towing vehicle. According to FIG. 7a, an earth-moving vehicle according to the prior art, which is the case of FIG. 7a is the vehicle to be towed, can be converted to be used with the towing arrangement of the system according to the invention by removing the tipper body 102 and its tipping cylinder 104. The tipper body 102 is pivoted to the tipper body's pivot point 80 and is operated with the aid of a tipping cylinder 104. The tipping cylinder 104 is in turn pivoted to the tipping cylinder's lugs 78, which belong to the earthmoving vehicles chassis, and are located under the chassis.

Because an earth-moving vehicle is the preferred way of implementing the towing vehicle, hereinafter the term earthmoving vehicle and the reference number 12 will be used for the towing vehicle, although it should be understood that the towing vehicle can be a towing vehicle suitable for some other purpose than earth-moving.

Figure 3A:
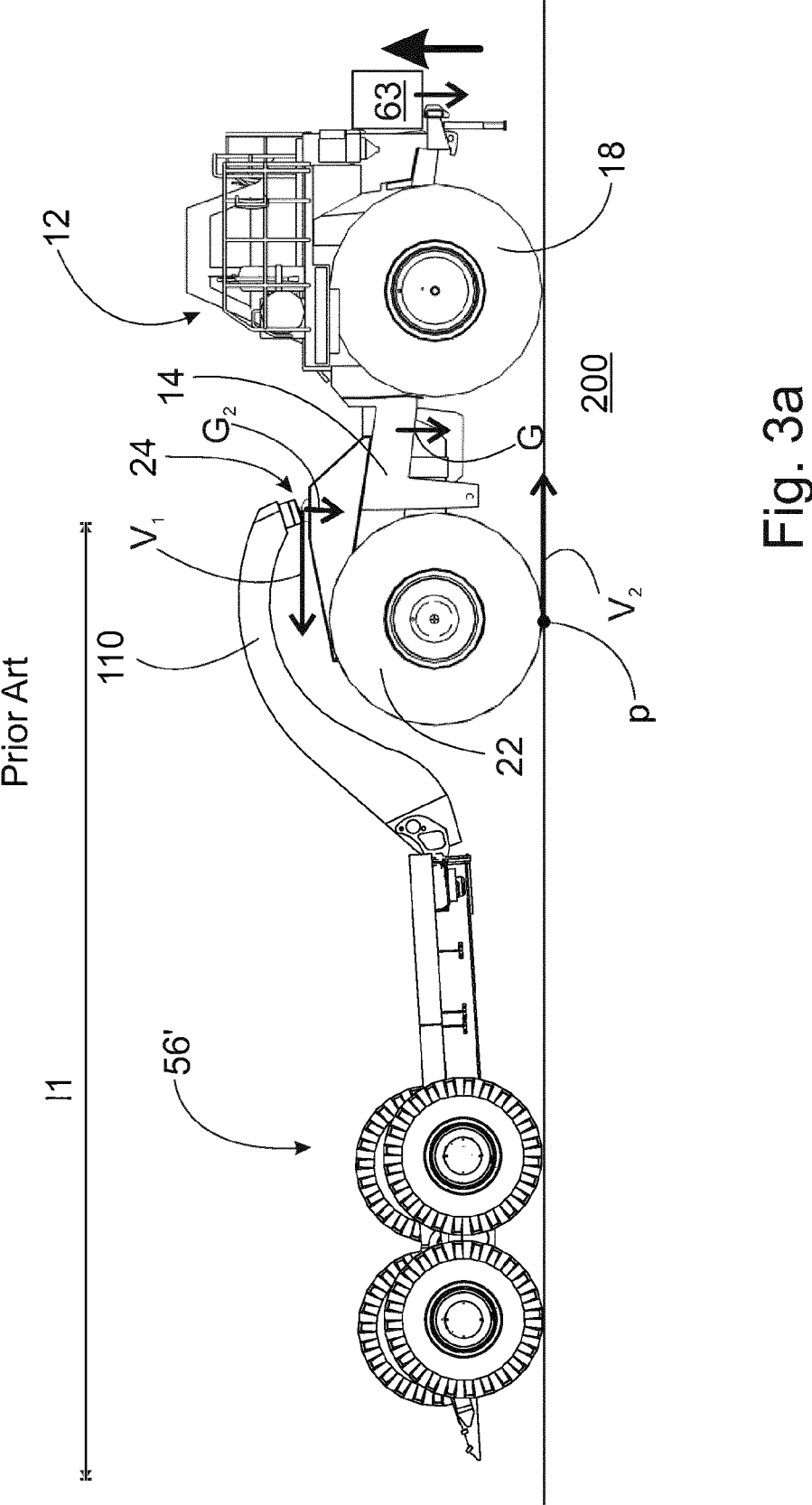
FIG. 3a shows a schematic side view of the forces acting on the system according to the prior art.
Figure 3B:
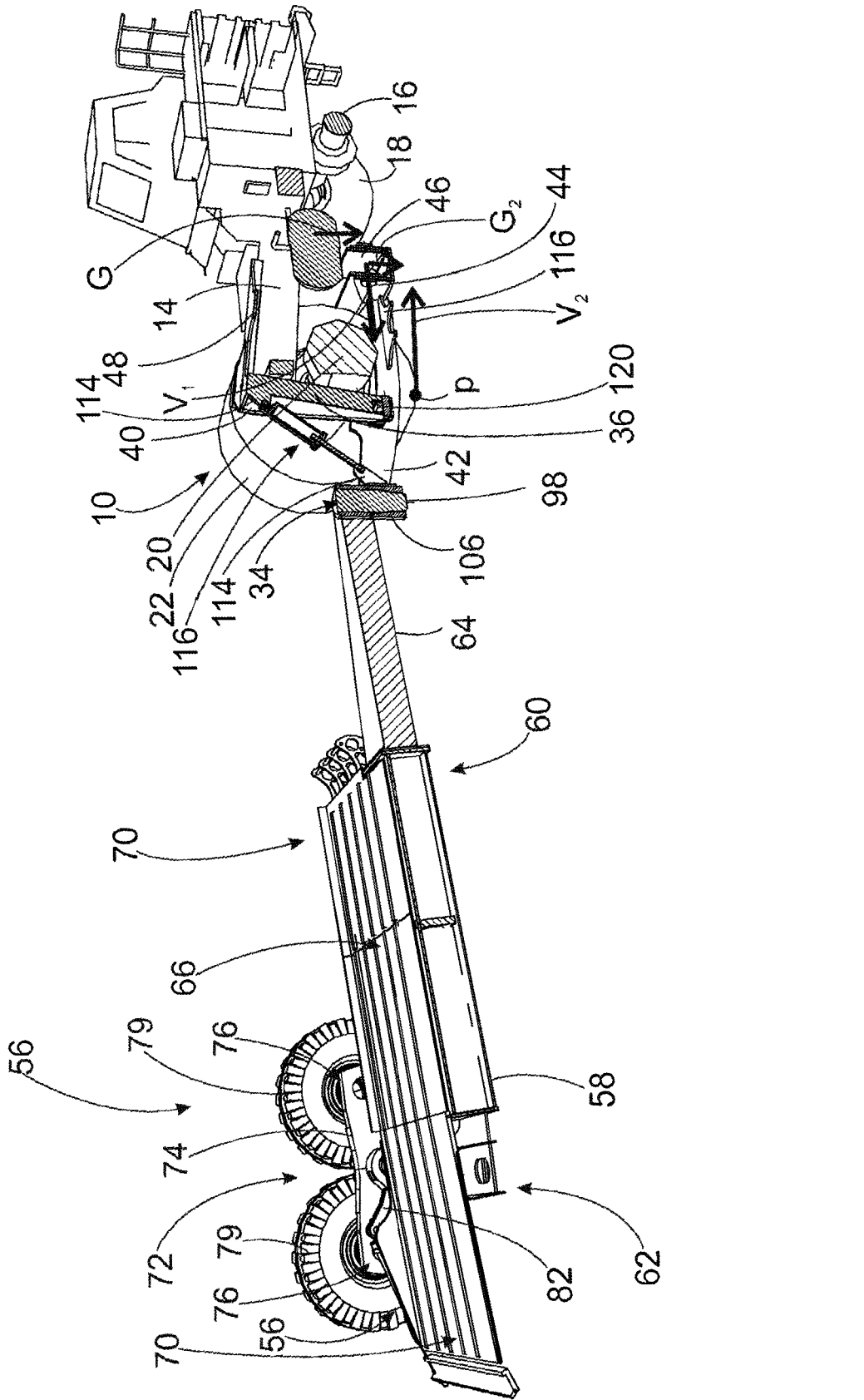
FIG. 3b shows a cross-section of the structure of a first embodiment of the towing arrangement of the system according to the invention and the forces acting on the system according to the invention.

The earth-moving vehicle 12 includes a chassis 14, better seen in FIG. 3b, a front axle 16 and a rear axle 20 attached to the chassis 14, as well as correspondingly front wheels 18 on the front axle 16 and read wheels 22 on the rear axle 20. The front wheels 18 can be steered and the chassis 14 is rigid in the sense that it does not have a central pivot for chassis steering such as is in dumpers of the prior art. The earthmoving vehicle 12 is preferably a vehicle originally intended for earth moving, in which the chassis 14 further includes tipper body pivot points 80, to which the tipper body is attached when earth moving. In this case the tipper body pivot points 80 are lugs, which are preferably located at the very rear of the chassis 14, on top of the chassis 14, in accordance with the prior art. Instead of lugs, a pivot pin hole may have been formed in the chassis, to which the attachment can be made. In addition, the chassis 14 preferably includes the tipping-cylinder lugs 78 that appear in FIG.

7a, which are located under the chassis 14, in the space between the front axle 16 and rear axle 20 in the earth-moving vehicle's 12 chassis 14. The tipping cylinders and tipper body are removed when the earth-moving vehicle 12 is used according to FIG. 2 as a towing vehicle for the trailer 56. The tipping cylinders' lugs 78 then remain free for other purposes and act advantageously in the system 50 according to the invention as the earth-moving vehicle's 12 towing point 24. The towing point can also be formed separately above or below the chassis or on both sides between the front axle and rear axle as a separate subframe.

The towing arrangement 10 is formed in connection with the earth-moving vehicle 12 and its purpose is to transmit the earth-moving vehicle's 12 traction to the trailer 56 and under the earth-moving vehicle's 12 rear axle 20 and to the rear of the earth-moving vehicle 12. The trailer's 56 attachment point and turning point relative to the earth-moving vehicle 12 can then be farther back, thus permitting more nimble turning for the totality formed by the earth-moving vehicle 12 and the trailer 56. In other words, the length 11 of the trailer's rigid portion can then be shorter than the corresponding length 11 of the trailer of the prior art of FIG. 3a.

Figure 4:
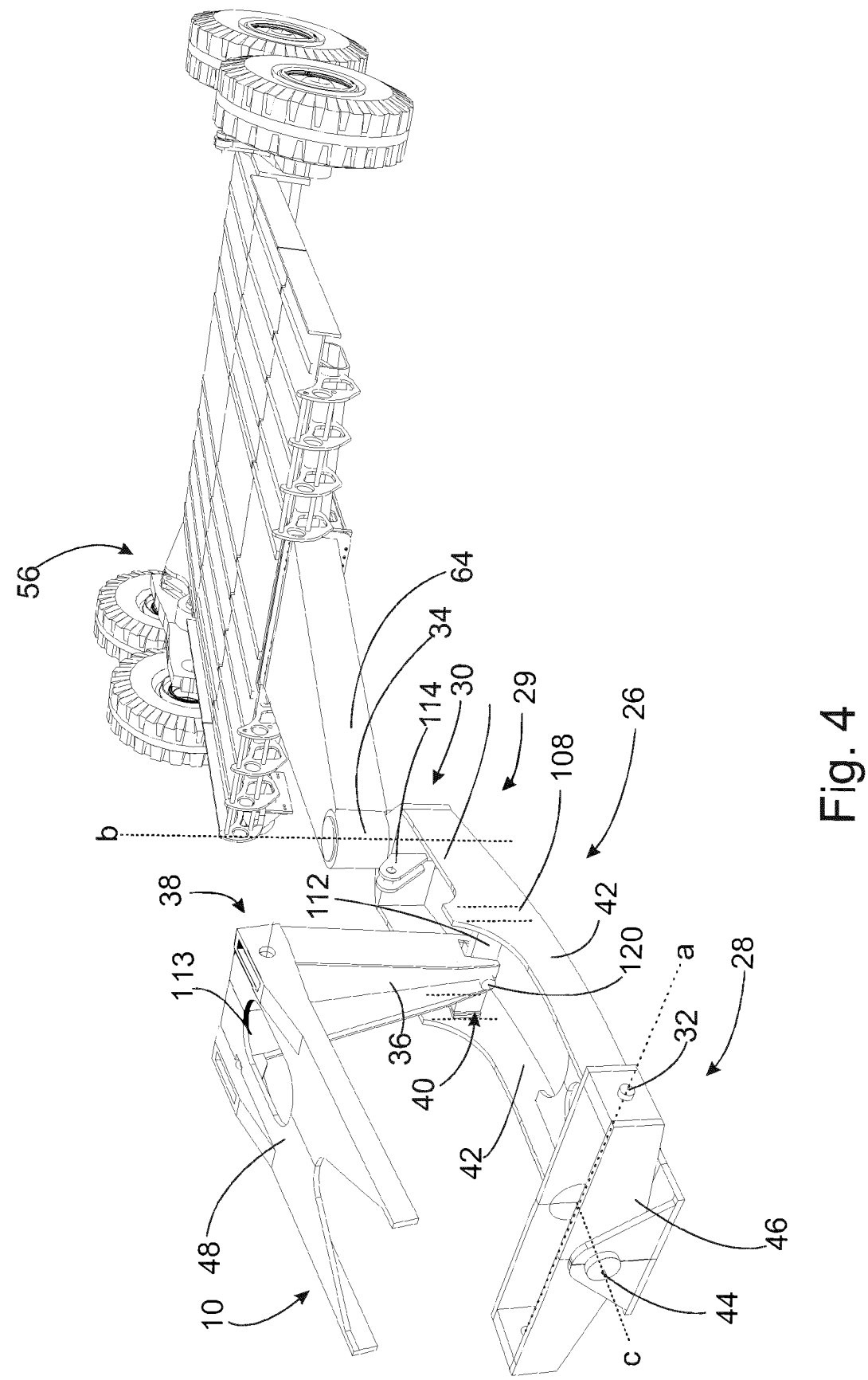
FIG. 4 shows an axonometric view of the first embodiment of the towing arrangement and the trailer according of the system to the invention separately.

In the first embodiment, the towing arrangement 10 includes the drawbar 26 shown in FIG. 4, which includes a first end 28 and a second end 29. The first end 28 is attached with the aid of a first pivot 32 to the earth-moving vehicle's 12 towing point 24 in the earth-moving vehicle's 12 body 14. This first pivot 32 is in the transverse direction of the earthmoving vehicle's 12 body 14 and is essentially horizontal. The drawbar's 26 towing point 30, i.e. the second pivot 34, is preferably formed at the other end 29 of the drawbar 26. The second pivot 34 is an essentially vertical pivot, transmitting a moment in the vertical direction, to which the trailer 56 is attached. Here, the term transmitting a moment in the vertical direction refers to the fact that the weight of the trailer and its load is transmitted through the second pivot 34 at least to the first pivot and through it to the earth-moving vehicle's chassis. The drawbar 26 attaches at its first end 28, preferably with the aid of a transverse arm 46 belonging to the towing arrangement 10, to the earth-moving vehicle's 12 towing point 24, the first end 28 being attached with the aid of the earthmoving vehicle's 12 longitudinal direction third pivot 44 to the transverse arm 46, which in turn is attached with the aid of the first pivot 32 to the earth-moving vehicle's 12 tipping-cylinder's lugs 78.

In other words, the towing arrangement 10 is preferably formed, according to FIG. 4, of three separate rotation axes a, b, and c, of which the first pivot 32 is in the transverse direction of the earth-moving vehicle 12, thus permitting rotation around the rotation axis a, the second pivot 34 is vertical, permitting rotation around the rotation axis b, and the third pivot 44 is in the longitudinal direction, permitting rotation around the rotation axis c. Each pivot permits rotation around only one rotation axis, transmitting a moment in the direction of the other rotation axes. This is also true of the second embodiment of the towing arrangement of the system according to the invention to be described later, according to FIG. 15. This permits the trailer's good accommodation to the ground-form. In this context, it should be understood that the third pivot, which permits the trailer to tilt around the earthmoving vehicle's longitudinal direction, can, in an alternative embodiment, also be arranged at the second end of the drawbar and in connection with the second pivot. Despite this, the second pivot can transmit a moment and the trailer and the load of the work machine on top of it as far as the first pivot, and through it to the earth-moving vehicle's towing point.

According to FIGS. 3b and 4, in the first embodiment the drawbar 26 is preferably given such a shape that it can be guided to run essentially longitudinally under the earth-moving vehicle's 12 rear axle 20 and between the rear wheels 22, when turning around the vertical axis between the towing arrangement 10 and the trailer 56 takes place in the second pivot 34 behind the earth-moving vehicle 12. In other words, the drawbar is at least partly curved, or a recess is formed in it to bypass the earth-moving vehicle's rear axle 20, if the rear axle 20 is on an imaginary line drawn between the towing point 24 and the second pivot 34.

Figure 5A:
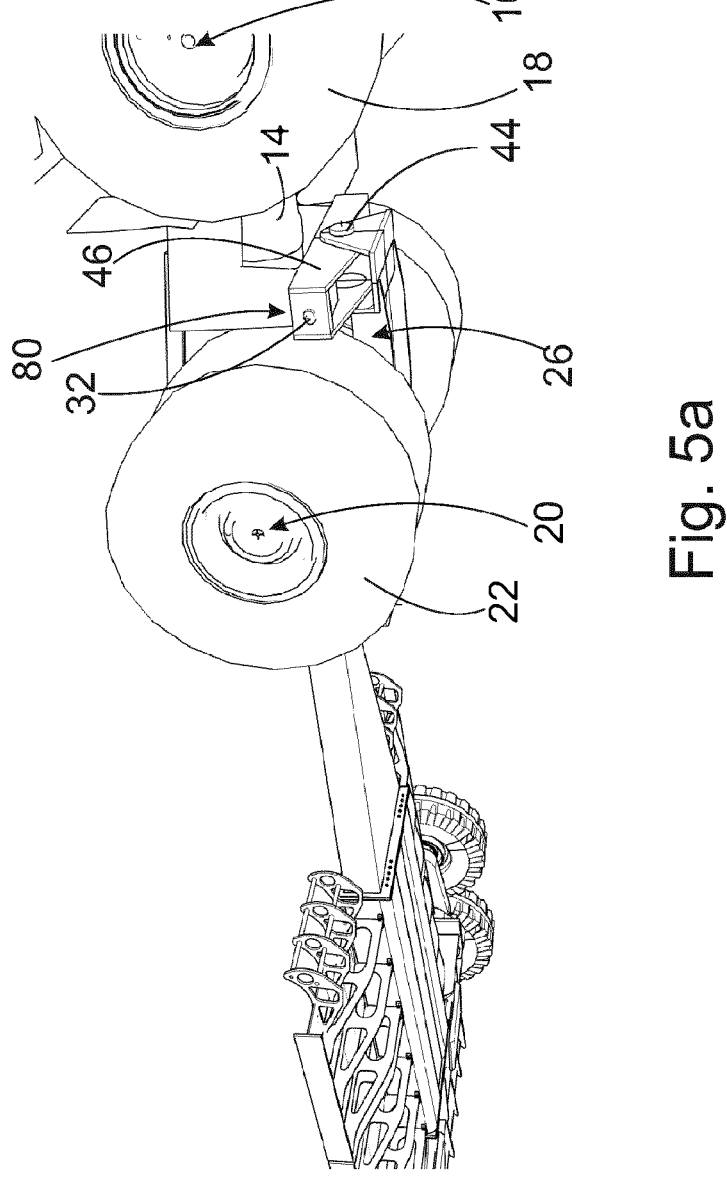
FIG. 5a shows an axonometric side view of the structure of a first embodiment of the towing arrangement as part of the system according to the invention.
Figure 5B:
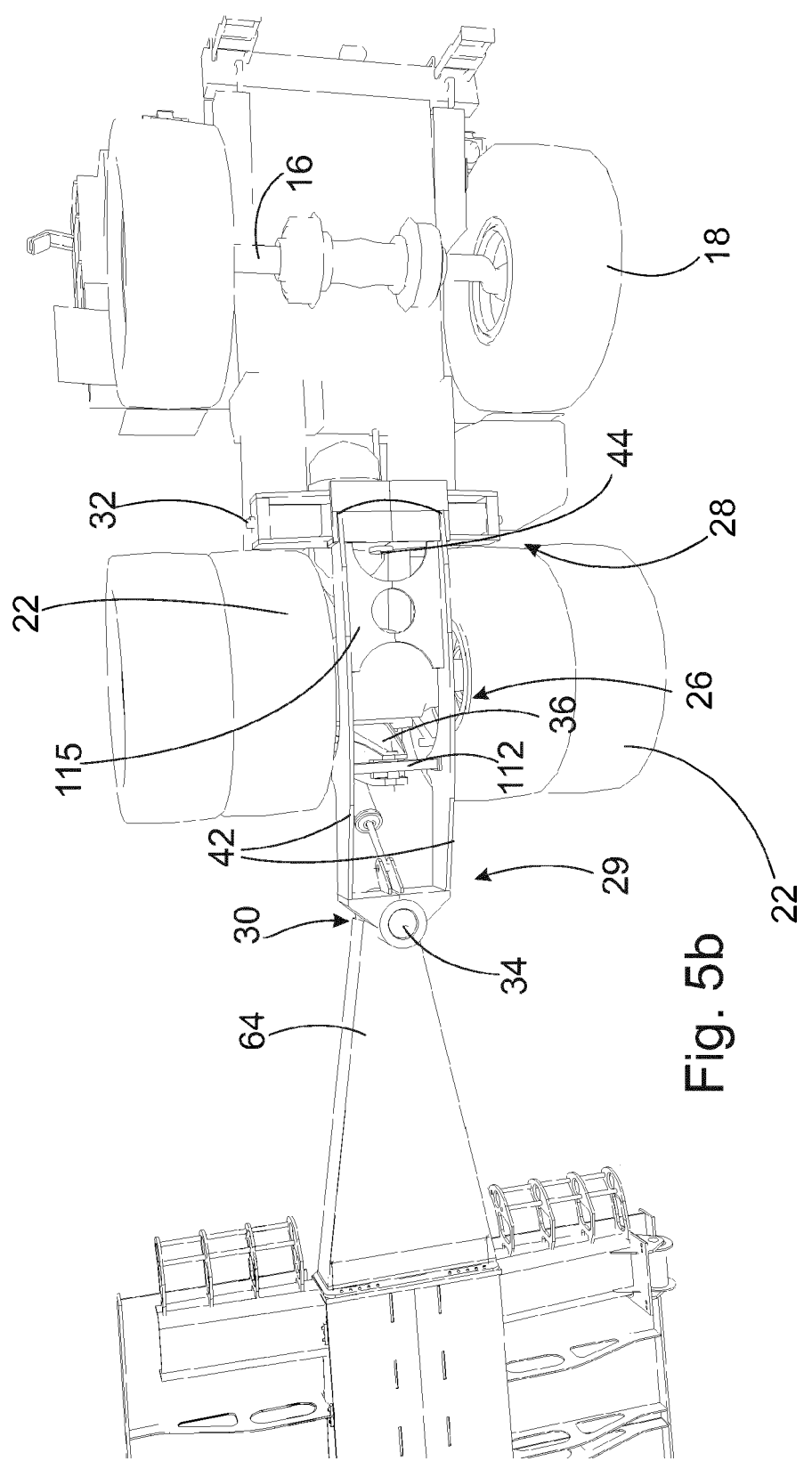
FIG. 5b shows an angled view of the structure of a first embodiment of the towing arrangement as part of the system according to the invention.

In the first embodiment, the drawbar 26 is preferably formed of two parallel arms 42, which are attached to each other at the first 28 and second ends 29 of the drawbar 26. According to FIG. 5b, there can also be a support 115 between the first 28 and second 29. The arms 42 can be cut from steel, which is welded to form a closed structure. Such a structure is quite light and cheap to construct. Earth-moving vehicles 12 according to the prior art are preferably of such an order of size, that in them the distance between the rear axle and the ground is is the order of 50 cm, so that the drawbar 26 can be led under the rear axle 20 without significantly weakening the earth-moving vehicle's off-road capability and ground clearance.

Because the second pivot 34 is located at the drawbar's 26 length from the drawbar's 26 attachment point to the earth-moving vehicle's 12 chassis 14, i.e. to the earth-moving vehicle's 12 towing point 24, a long moment arm is formed between the first pivot 32 and the second pivot 34 for the earth-moving vehicle's 12 transverse forces. To receive this torsion, a support arm 36, which includes an attachment end 38 and a support end 40, is formed in the first embodiment of the towing arrangement 10. The support arm 36 is attached to the earthmoving vehicle's 12 chassis 14 by the attachment end 38. The attachment preferably takes place in the earth-moving vehicle's 12 tipper-body lugs 78, which are already in the earth-moving vehicle 12. Alternatively, separate lugs can be formed for the attachment in the chassis 14. The support arm's 36 support end 40 is arranged between the arms 42 forming the drawbar 26, where it is in near or direct contact with the arms' 42 inner surfaces. The support end 40 can include a wear surface 112 pivoted with the aid of a pin 120, the material of which is steel with less wear resistance than the arms 42. Preferably the wear surface 112 touches and supports the arms 42 transversely according to FIG. 5b, the transverse loadings being so great that the drawbar 26 would otherwise twist. Thus the drawbar's 26 structure can be very light, as the transverse forces are received with the aid of the support arm 36. In addition, the use of a support arm 36 allows the drawbar 26 to turn relative to the first pivot 32 to adjust the height of the drawbar 26.

To securely attach towing arrangement 10, the towing arrangement 10 preferably includes, in the first embodiment, a chassis support 48, which is attached on top of the earthmoving vehicle's 12 chassis 14. The chassis support 48 is intended to permit a more secure attachment of the drawbar 36 to the earth-moving vehicle's 12 chassis 14. On the other hand, the chassis support 48 preferably extends in the earth-moving vehicle's 12 longitudinal direction essentially to the earthmoving vehicle's 12 towing point 24, so that the chassis support 48 too can be attached to the tipper body's pivot points 80, preferably to the tipper body's lugs. The towing arrangement's drawbar 26, support arm 36, and chassis support 48 then form a closed frame-like structure, which is extremely sturdy. The chassis support 48 can be lightened with the aid of an opening 113.

The trailer 56 is preferably part of the system 50 according to the invention. According to FIG. 3b, the trailer 56 includes a chassis 58 comprising a towing end 60 and a loading end 62, as well as a towing arm 64 for coupling the trailer 56 to the earth-moving vehicle's 12 towing point 24. In addition, the trailer 56 includes an essentially level deck 66 comprising a front end 68 and a rear end 70, fitted on top of the trailer's 56 chassis 58. The deck 66 supports the work machine to be towed driven onto it. The trailer's 56 chassis 58 is supported on the ground preferably using swing bogies 72 belonging to the trailer 56. The swing bogies 72 are fitted on both sides of the trailer's 56 chassis 58 at the sides of the deck 66. Each swing bogie 72 includes a swing arm 74 connected to the trailer's 56 chassis 58 and comprising two ends 76, between which is a swing bearing, by which the swing arm 74 is attached to swing on the trailer's 56 chassis 58. At each end 76 of the swing arm 74 is one wheel 79. The trailer's 56 towing arm 64 is attached to the towing arrangement 10 of the system according to the invention with the aid of its second pivot 34, when the trailer's 56 arm weight is transmitted through the towing arrangement 10 to the earth-moving vehicle's 12 chassis.

Figure 9:
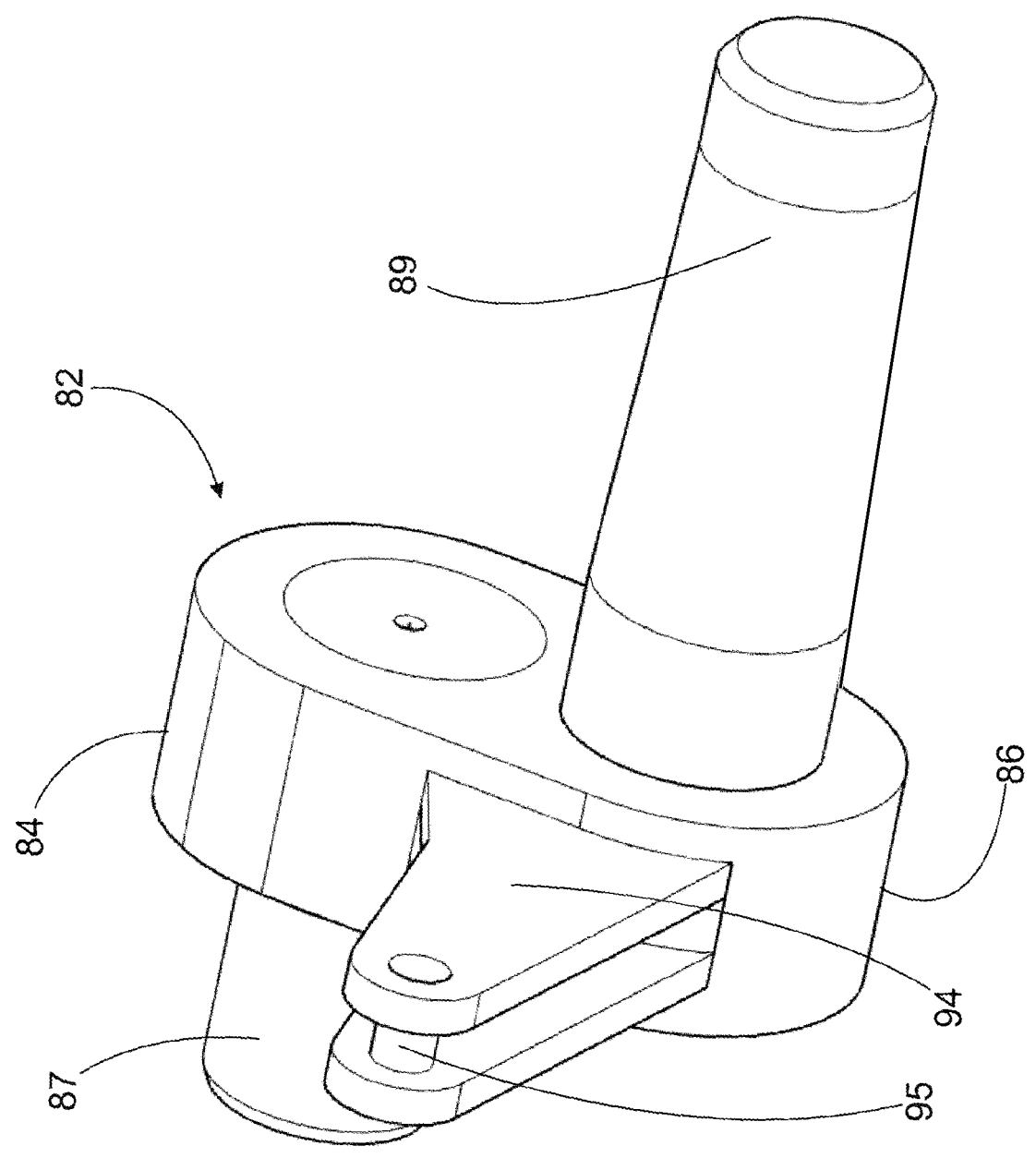
FIG. 9 shows an axonometric view of the trailer's eccentric arm separately.
Figure 10A:
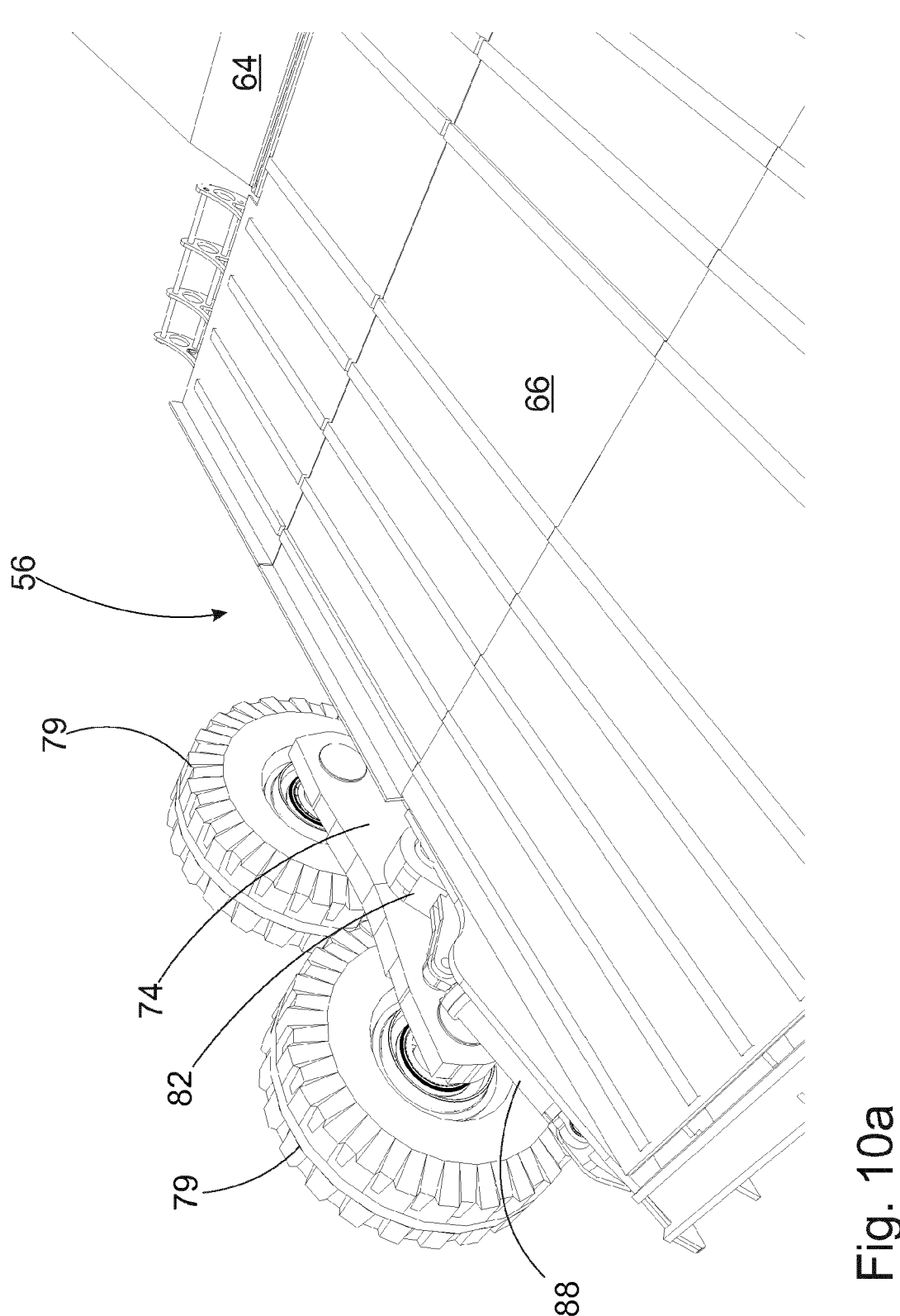
FIGS. 10a and 10b show the structure of the trailer's eccentric arm seen from different angles.
Figure 10B:
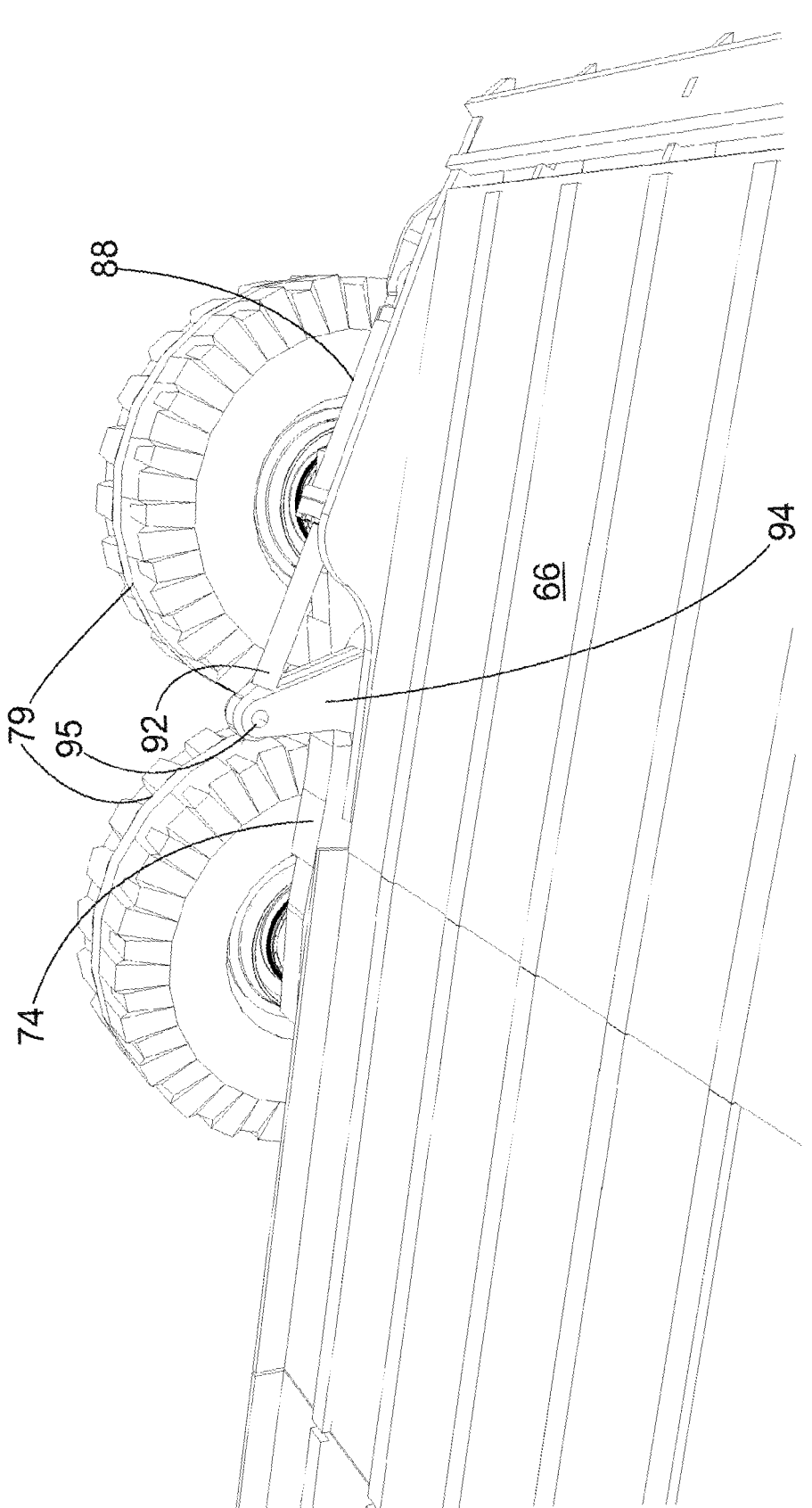

Each swing bogie 72 is preferably implemented, in such a way that with its aid the deck's 66 rear end 70, from which the work machine's loading onto the trailer 56 takes place, can be lowered onto the ground. Thus the trailer's 56 deck 66 can be a uniform and level plane, so that the work machine need not cross a particular threshold when being loaded on the trailer. More specifically, this property can be achieved by using in the swing bogie 72 the eccentric arm 82 seen in FIGS. 9 and 10a, which is mounted in bearings from its first end 84 by means of the trailer's 56 chassis' 58 axle pin 87. The eccentric arm's 82 second end 86 is in turn mounted in bearings by means of the swing arm's 74 second axle pin 89. The eccentric arm 82 is operated with the aid of an operating device 88, which is in turn pivoted from its first end 90 to the trailer's 56 chassis 58 and from its second end 92 to a pivot point 95 formed in the lug 86 between the eccentric arm's 82 first 84 and second 86 ends.

Instead of swing bogies, in the implementation of trailers with a smaller capacity on each side of the trailer there can be only a single wheels mounted in bearings directly to the eccentric arm's end, instead of to a swing arm.

FIGS. 3a and 3b can be compared to see the difference in the forces acting relative to the earth-moving vehicle 12, when in FIG. 3a a trailer 56 according to the prior art is towed and, on the other hand, in FIG. 3b a trailer 56 of the system according to the invention is towed using the towing arrangement 10 of the system according to the invention. In the towing arrangement 10 according to the invention the towing point 24 is formed under the chassis 14 near to the level of the rear axle 20, when the trailer's 56 backwards acting horizontal force $V_1$ tends to turn the earth-moving vehicle's 12 front axle 16 towards the ground 200. Correspondingly, the vertical gravity force $G_2$, caused by the trailer's 56 mass, is transmitted through the same towing point 24 as the earthmoving vehicle 12, and tends to press the earth-moving vehicle's 12 front axle 16 and front wheels 18 towards the ground 200. Thus, when using the towing arrangement of the system according to the invention, the lightening of the earth-moving vehicle's front wheels is prevented, so that it is also unnecessary to use an additional weight 63, shown in FIG. 3, in front of the earth-moving vehicle 12. This in turn increases the economy and transport capacity of the earth-moving vehicle, as well as the safety of transfers. On the other hand, with the aid of the towing arrangement, the weight of the trailer and the work machine on top of it can be exploited to press the earth-moving vehicle's driving wheels towards the ground, thus improving traction grip. This is due to the swing bogies 72 being attached to the trailer's 56 chassis 58 closer to the loading end, according to FIG. 3b, when the load's centre of gravity is located between the swing bogie's 72 support point and the second pivot 34, the trailer 56 thus transmitting the load also to the earth-moving vehicle's 12 towing point 24.

Figure 18:
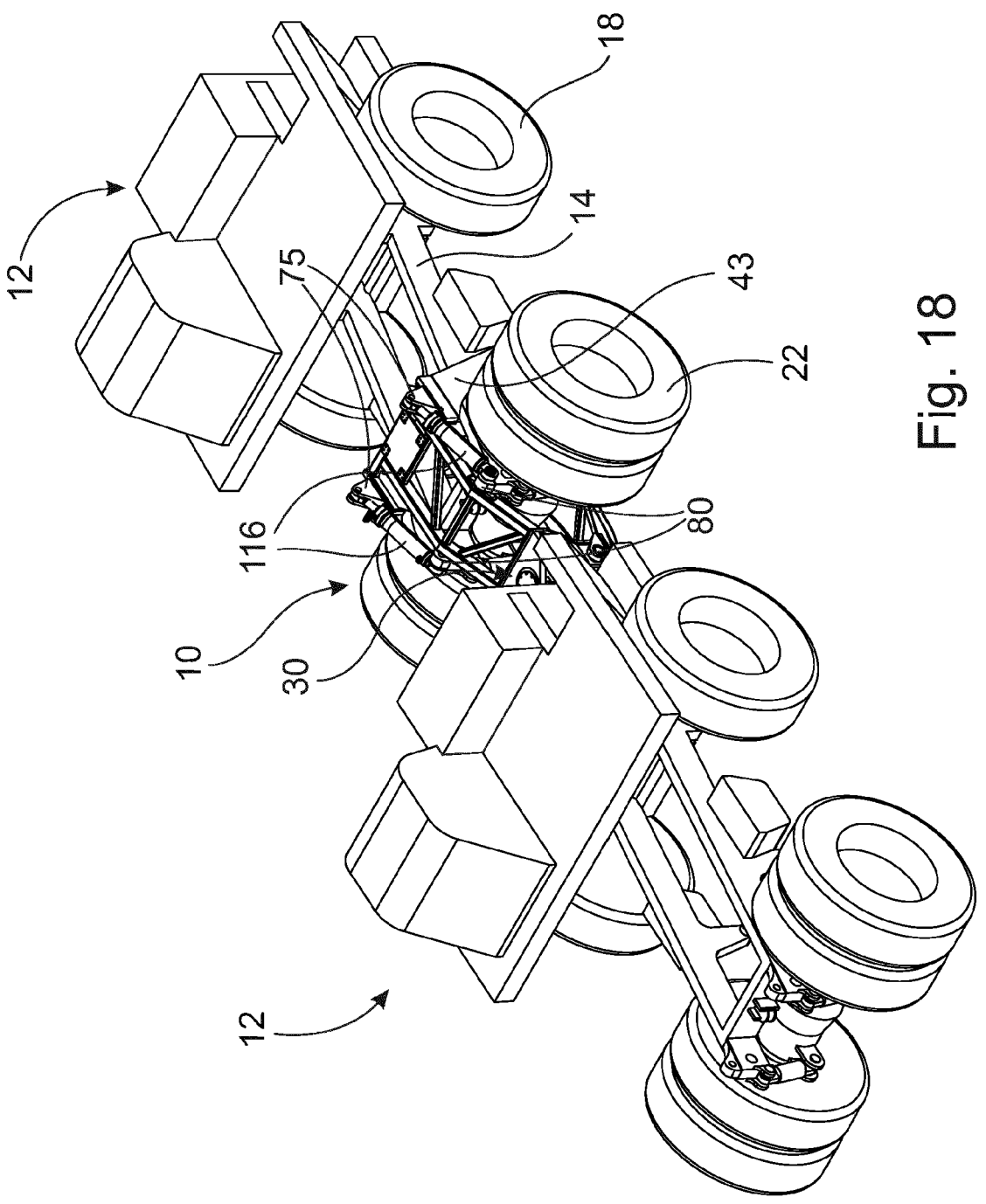
FIG. 18 shows axonometrically the use of a second embodiment of the towing arrangement of the system according to the invention when towing another earthmoving vehicle.
Figure 19:
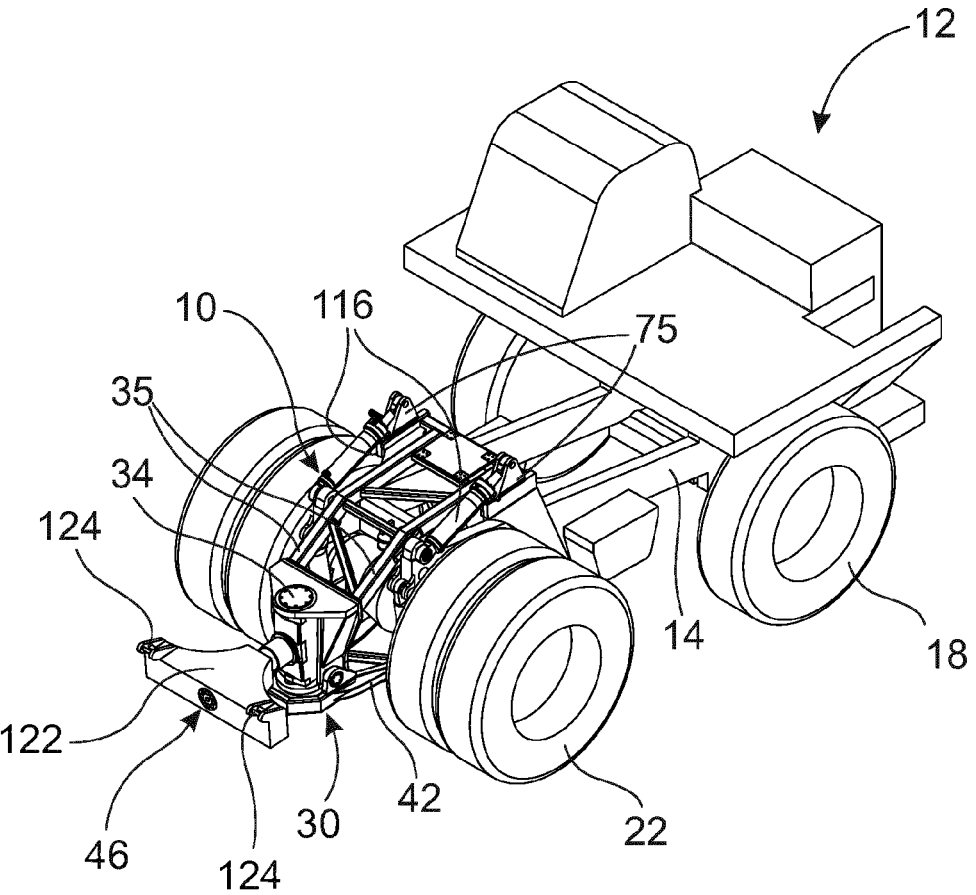
FIG. 19 shows an axonometric view of the use of a second embodiment of the towing arrangement of the system according to the invention in a towing vehicle without another earth-moving vehicle being towed.
Figure 20:
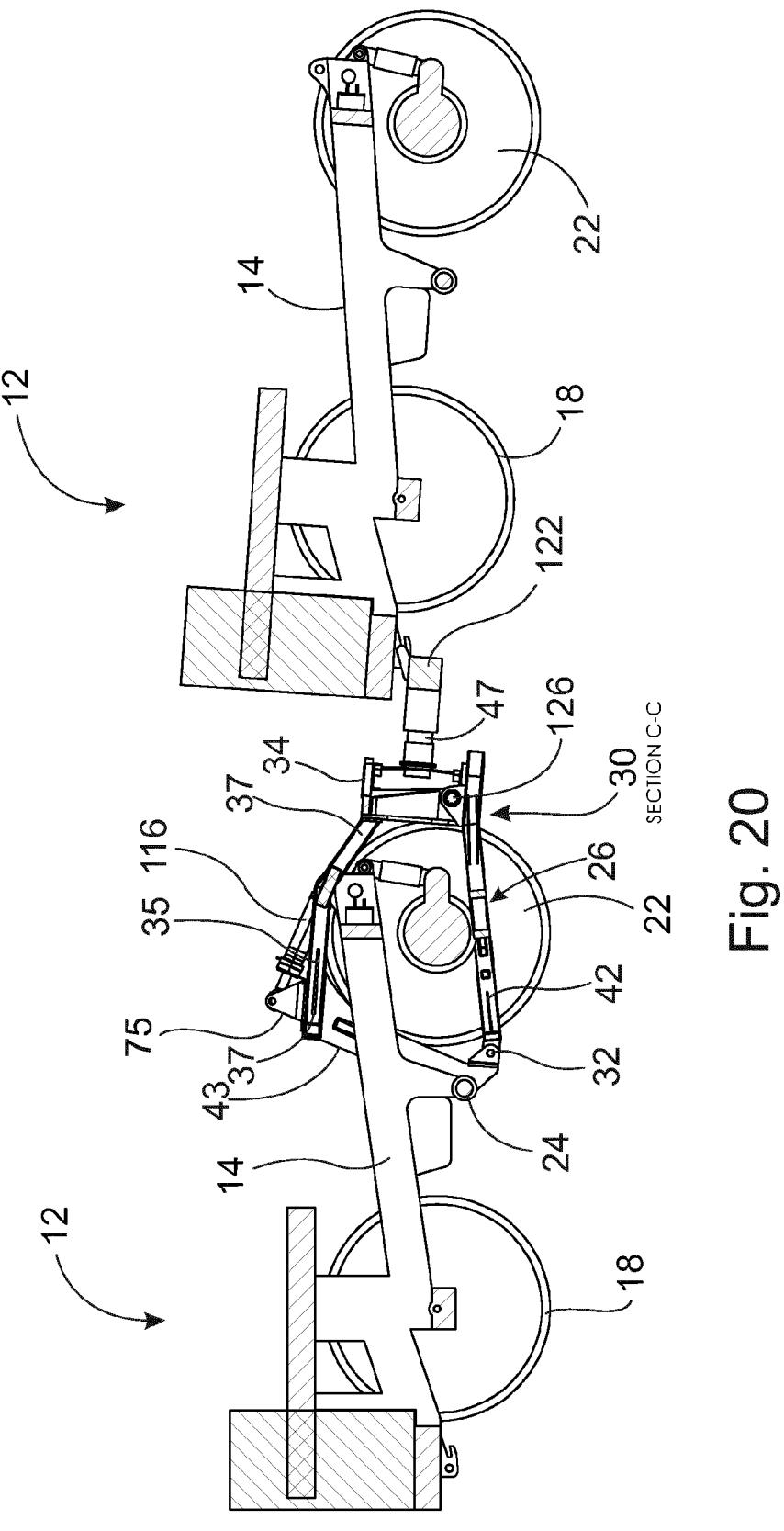
FIG. 20 shows a side view of the use of a second embodiment of the towing arrangement of the system according to the invention when towing another earthmoving vehicle.

The towing arrangement 10 of the system according to the invention can be used, not only to tow the trailer 56 of the system according to the invention, but also to tow another earth-moving vehicle 12 according to FIG. 7a, using the towing arrangement 10 according to the first embodiment or, according to FIGS. 18-20 using the towing arrangement 10 according to the second embodiment. The other earth-moving vehicle 12 is then a device to be towed. The earth-moving vehicle 12 to be towed is supported on the towing arrangement 10 with the aid of the second pivot 34, the second end 29 of the drawbar 26 being raised to partially lift the other earth-moving vehicle, to be able to be towed by the earth-moving vehicle equipped with the towing arrangement. According to the first embodiment, the towing arrangement 10 can include lugs 114 for fitting the lifting cylinder 116 between the drawbar's 26 second end 29 and the support arm 36, according to FIG. 3b. A lifting cylinder is not needed when using the towing arrangement with a trailer. Ball joints permitting tilting can be used to attach the lifting cylinders.

Figure 7B:
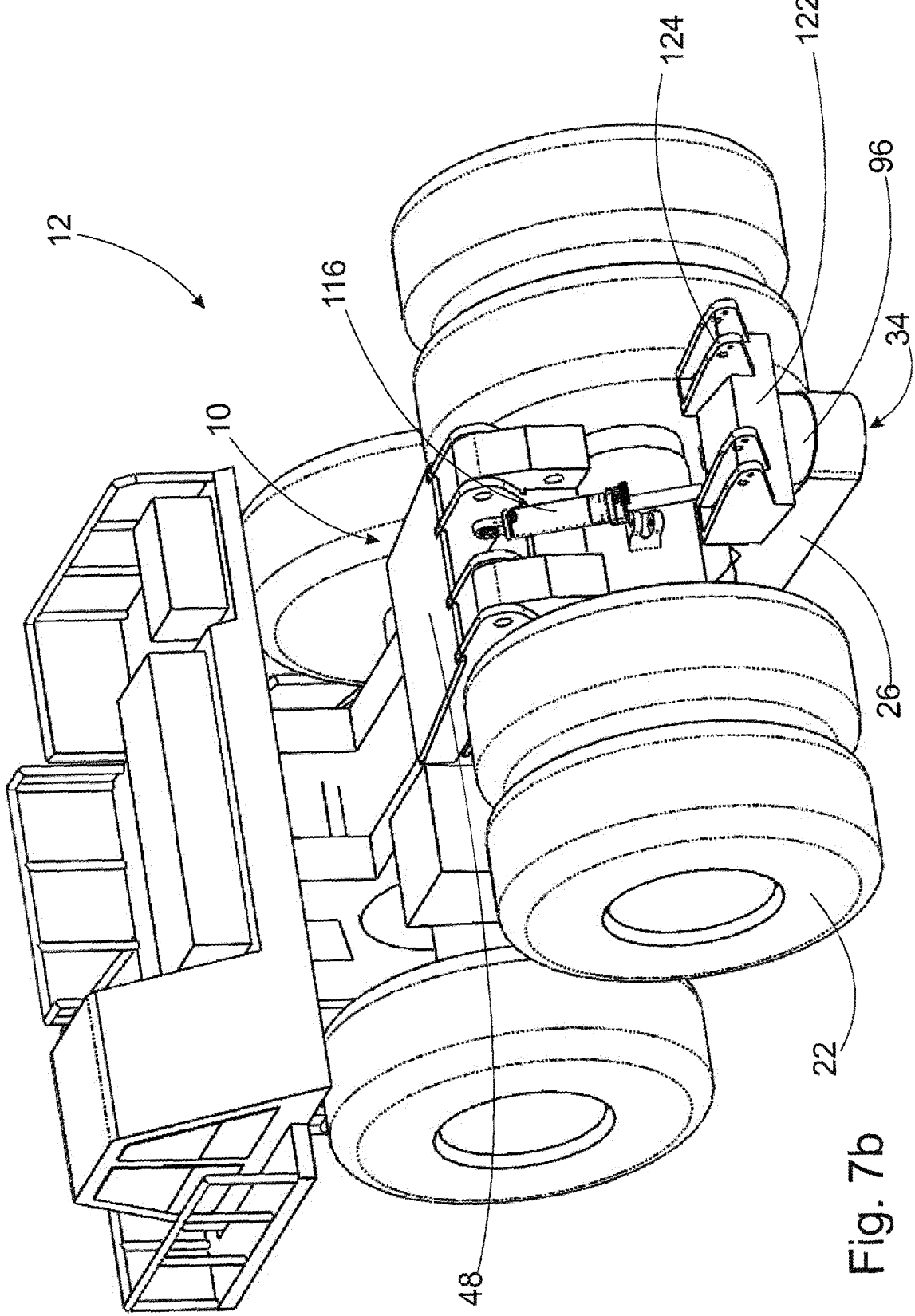

The chassis attachment 122, which comprises the towing pin 96 as the trailer's attachment means 81, and is visible in the first embodiment's FIGS. 7a and 7b and the second embodiment's FIGS. 19 and 20, is preferably attached to the front of the chassis of the earth-moving vehicle 12 to be towed. The towing pin 96 is part of the second pivot 34 and through it traction is transmitted, during towing, through the chassis attachment 122 to the chassis of the earth-moving vehicle to be towed. The chassis attachment 122 can include lugs 124, by which the chassis attachment is attached to the chassis of the earth-moving vehicle to be moved. In the second embodiment of FIGS. 19 and 20, the towing arrangement's 10 third pivot's 44 pivot shaft 47 attaches to the chassis attachment 122.

So that with the aid of the towing arrangement's second pivot a moment and through it the weight of the trailer and its load can be transmitted to the earth-moving vehicle's towing point, the second pivot must have an extremely tight fit horizontally. Because the towing arrangement can also be used for towing another earth-moving vehicle without the trailer, the structure of the second pivot in the system according to the invention must be such that the trailer or other earth-moving vehicle can be attach to it rapidly and easily. For towing another earth-moving vehicle, a towing attachment or suitable adapter should be installed on the towing pin, with the aid of which the earth-moving vehicle to be towed can be safely coupled.

Figure 6:
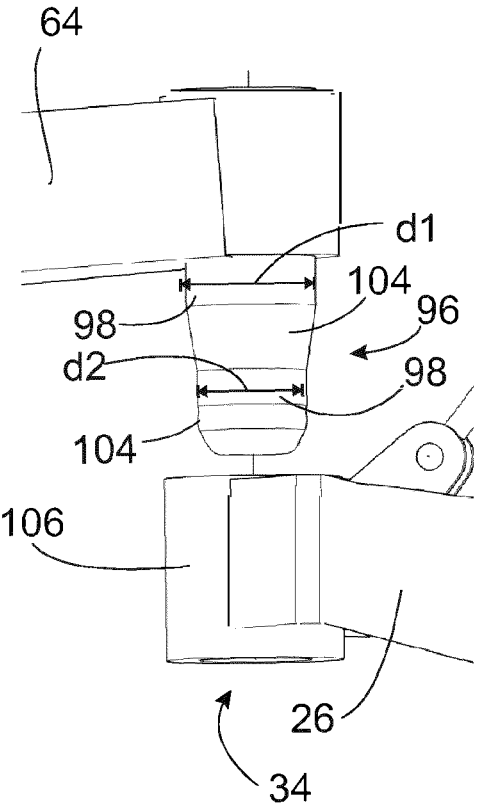
FIG. 6 shows a side view of the structure of an embodiment of the second pivot of a first embodiment.
Figures 8A, 8B, 8C:
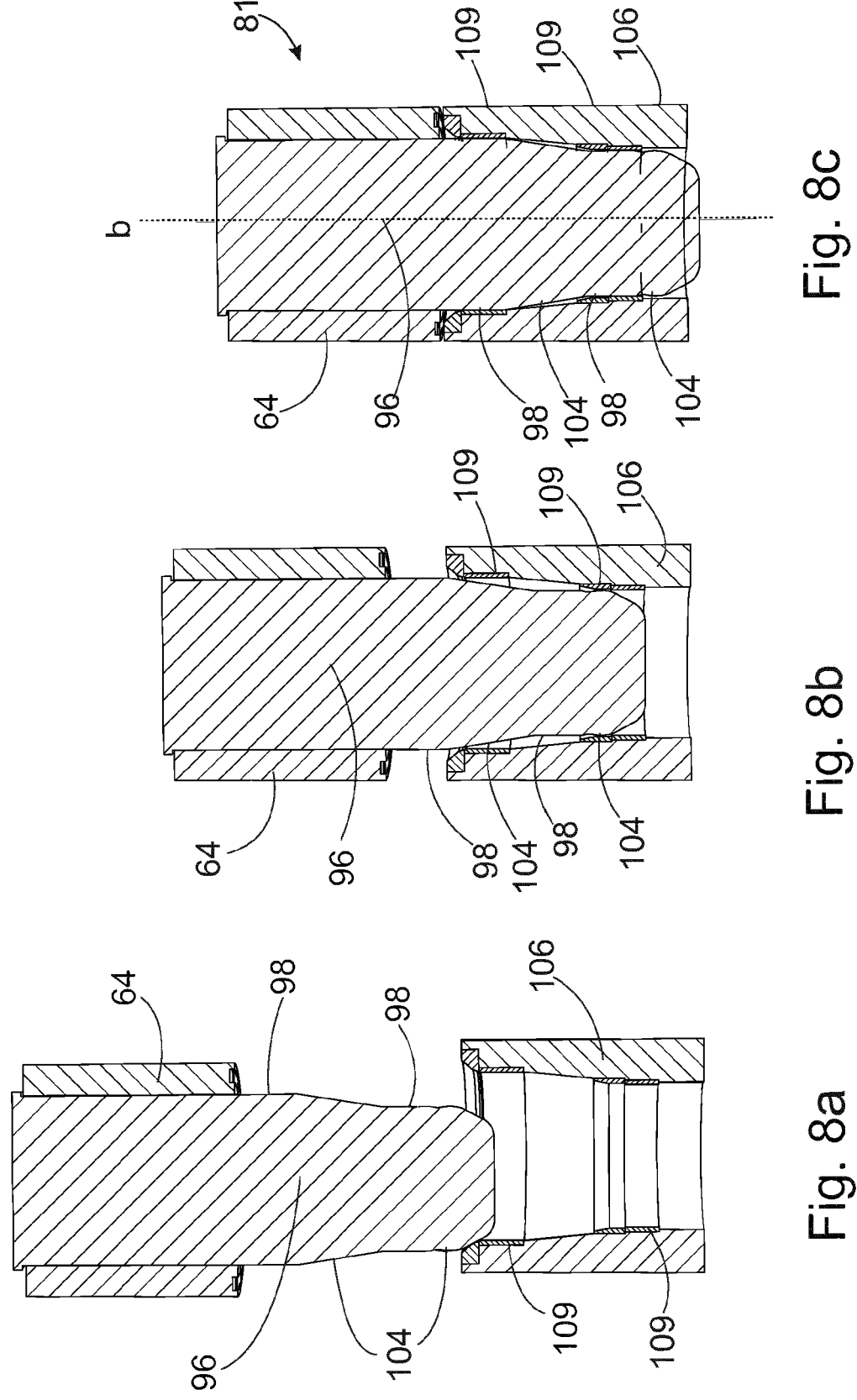
FIGS. 8a-8c show a side cross-section of the structure of an embodiment of the second pivot.

For this, in the invention's first embodiment the second pivot 34 is preferably formed of a towing pin 96 and a towing sleeve 106 to be attached to the trailer's towing arm 64 or the other earth-moving vehicle to be towed, according to FIG. 6. The towing pin 96 preferably includes slide-bearing surfaces 98 equipped with two different diameters d1 and d2, and guide surfaces 104 with a changing diameter between the slide-bearing surfaces 98. In addition, the point of the towing pin 96 is also preferably rounded. The towing sleeve's 106 inner surface 108 is shaped to correspond to the towing pin 96, according to FIGS. 8a-8c. In addition, the towing sleeve's 106 inner surface includes slide bearings 109. The diameter d1 is preferably greater than the diameter d2, so that the towing pin 96 narrows towards its point. With the aid of the slide-bearing surfaces 98 of two different diameters and guides surfaces 104, placing the towing pin 96 in the towing sleeve 106 can be performed in the stages of FIGS. 8a-8c, in which the towing pin's 96 rounded point is easily guided to the middle of the towing sleeve 106, when the final tight fit of the towing pin 96 and the towing sleeve 106 does not hinder installation. The towing pin is locked in place mechanically or otherwise during operation, the locking permitting rotation.

Traditionally when using conical pins the problem has been the difficulty to bring the pin and the towing sleeve into line relative to each other, so that they fit tightly into each other. In addition, the problem has been aggravated by the structures' large size, which prevents moving the structures. In the system according to the invention, this problem is solved with the aid of the aforementioned second pivot's structure.

FIGS. 11-20 show a second embodiment of the towing arrangement 10 of the system 50 according to the invention, which differs from the first embodiment of FIGS. 2, 3a, and 4-10b, in the case of the structures of the towing arrangement 10. In the second embodiment, the towing arrangement's 10 third pivot 44 has been moved from being in connection with the first pivot 22 to being in connection with the second pivot 34, when the support arm 36 according to the first embodiment located between the drawbar 26 is no longer needed, as in the second embodiment, an upper draw bar 35 is used as an addition to the drawbar 26. The upper drawbar 35 is also supported on the earthmoving vehicle's 12 chassis 14, but over the earth-moving vehicle's 12 rear axle 20 according to FIGS. 12a and 12b. As the longitudinal direction tilting of the combination of the trailer and earth-moving vehicle 12 taking place through the third pivot 44 takes place behind the drawbar 26, the upper drawbar 35 provides sufficient transverse support for the drawbar 26, even though the drawbar's 26 structure might be quite light. The advantage of such a construction compared to that according to the first embodiment is that the second embodiment's drawbar can be implemented as a quite light structure, which facilitates the use of the towing arrangement in connection with such earth-moving vehicles, in which there is little space under the rear axle.

Figure 15:
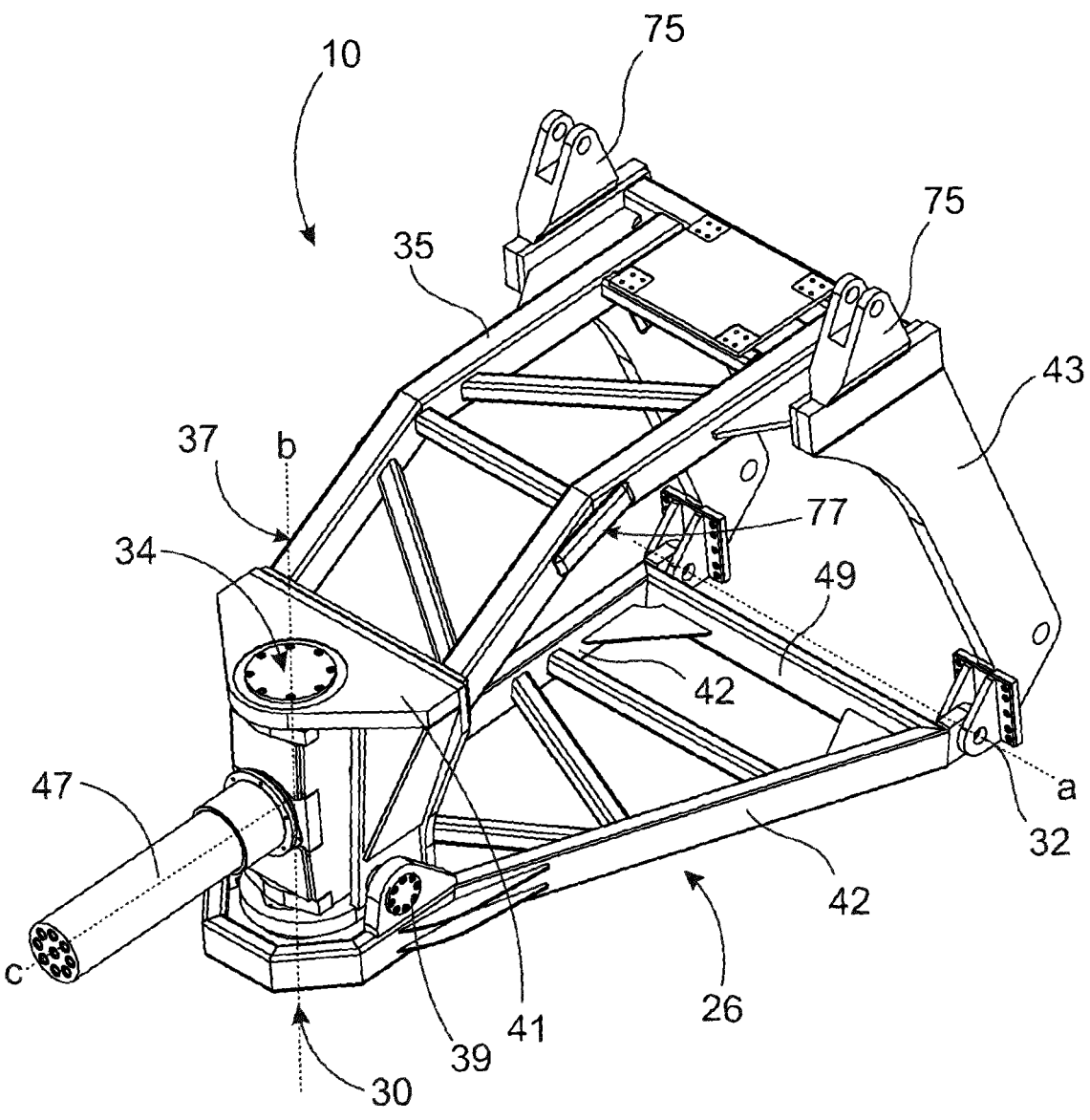
FIG. 15 shows an axonometric view of a second embodiment of the towing arrangement of the system according to the invention separately, FIG. 16 a top view of a second embodiment of the towing arrangement of the system according to the invention separately.
Figure 16:
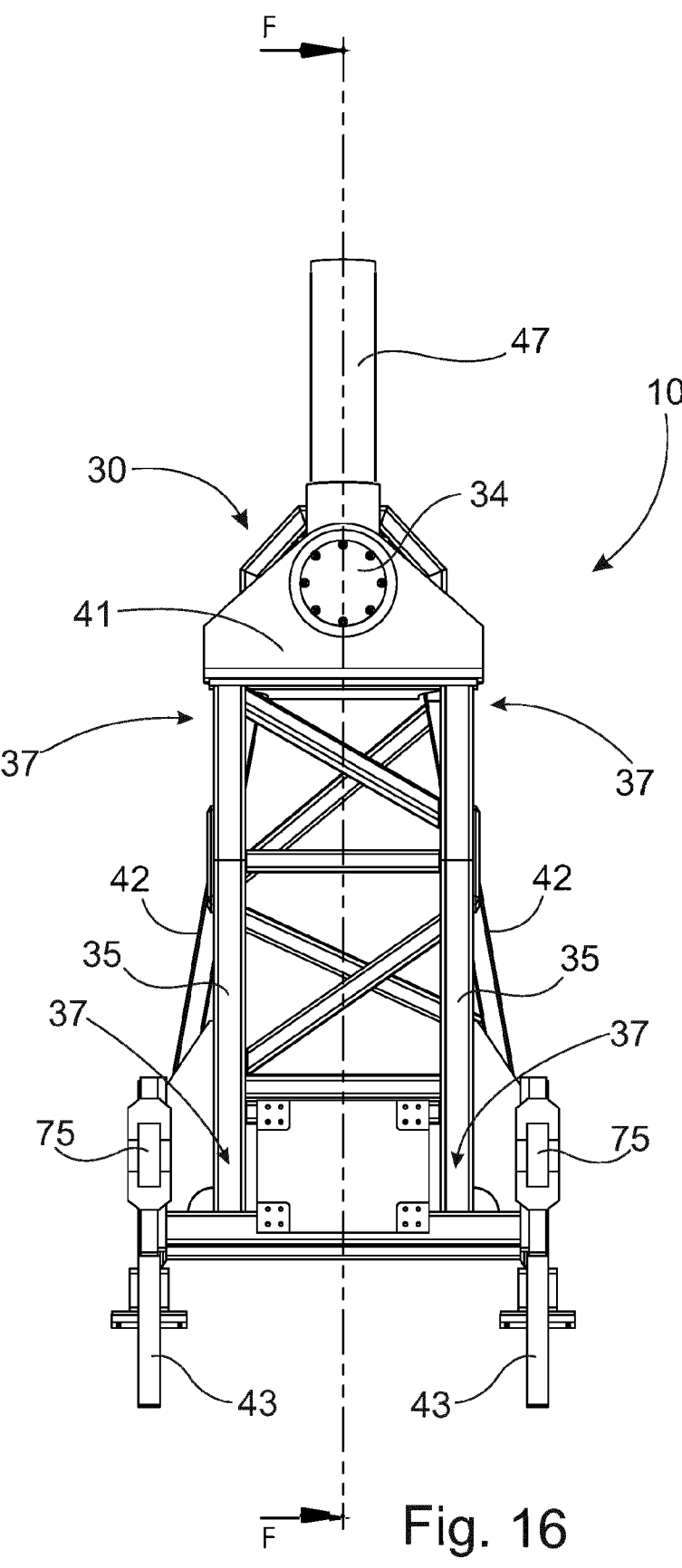
Figure 17:
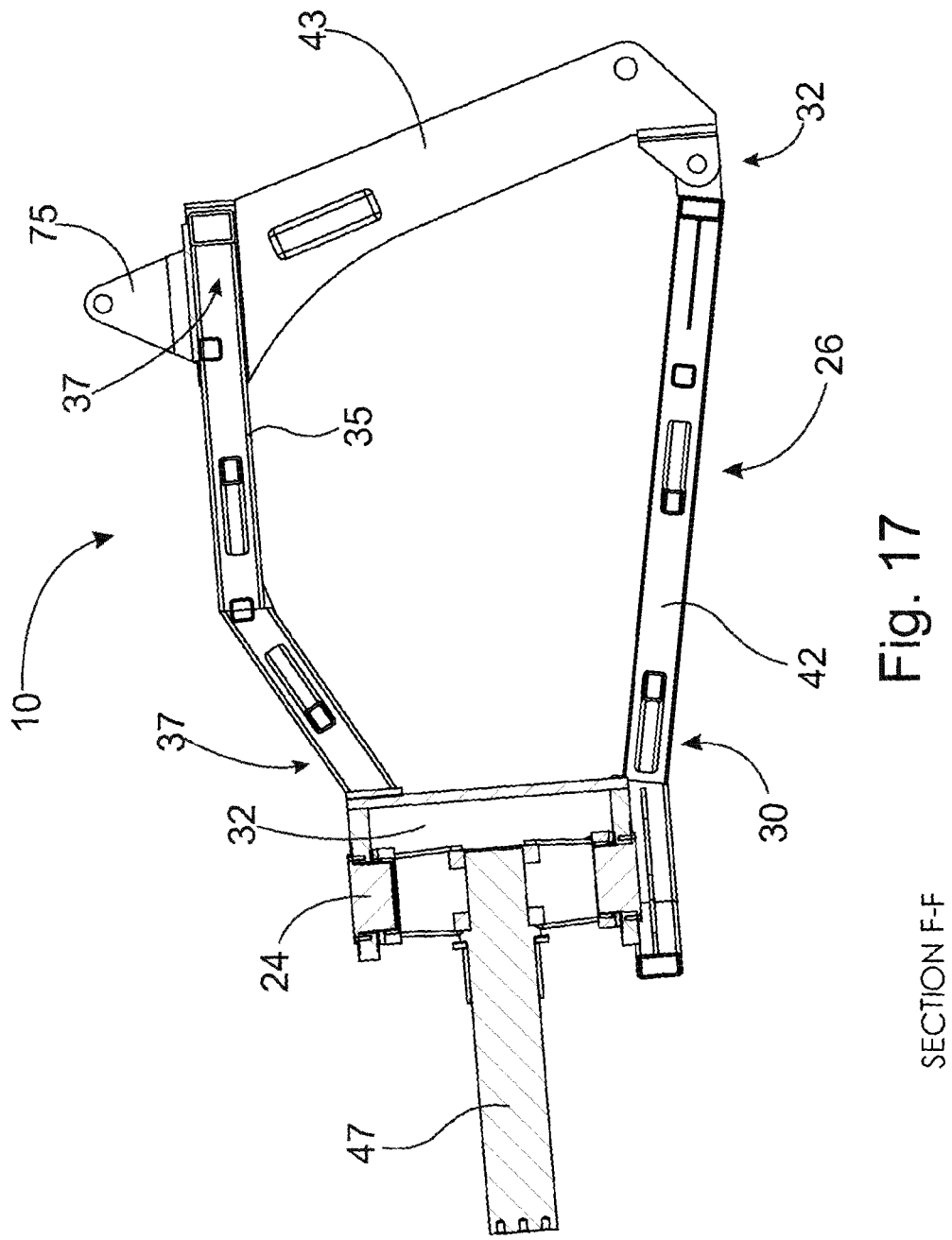
FIG. 17 shows a side cross-section of a second embodiment of the towing arrangement according to the invention separately.

The towing arrangement 10 according to the second embodiment is preferably, however, a closed annular structure according to FIG. 15, i.e. the upper drawbar 35 still connects back to the earth-moving vehicle's 12 towing point 24 with the aid of separate connector arms 43, the drawbar 26 too being connected to it from its first end 28. Such a closed annular structure or frame structure is very rigid and sturdy, even through the drawbar 26 and upper drawbar 35 might be of quite light construction. In the second embodiment of the towing arrangement the towing arrangement 10 includes a vertical support 41, to which the drawbar 26 attaches at one end 30 and the upper drawbar 35 attaches at the other end 37. The second 34 and the third 44 pivots are formed in the vertical support 41. Pivoting of the third direction of movement is provided by the first pivot 22, which is formed in the earth-moving vehicle's 12 towing point 24 underneath the chassis 14. The trailer 56 is attached to the towing arrangement 10 through the third pivot's 44 pivot shaft 47, which in this case forms the drawbar's 26 towing point 30. In FIG. 15, reference number 39 refers to the rigid pin joint that attaches the vertical support to the drawbar 26.

Figure 11:
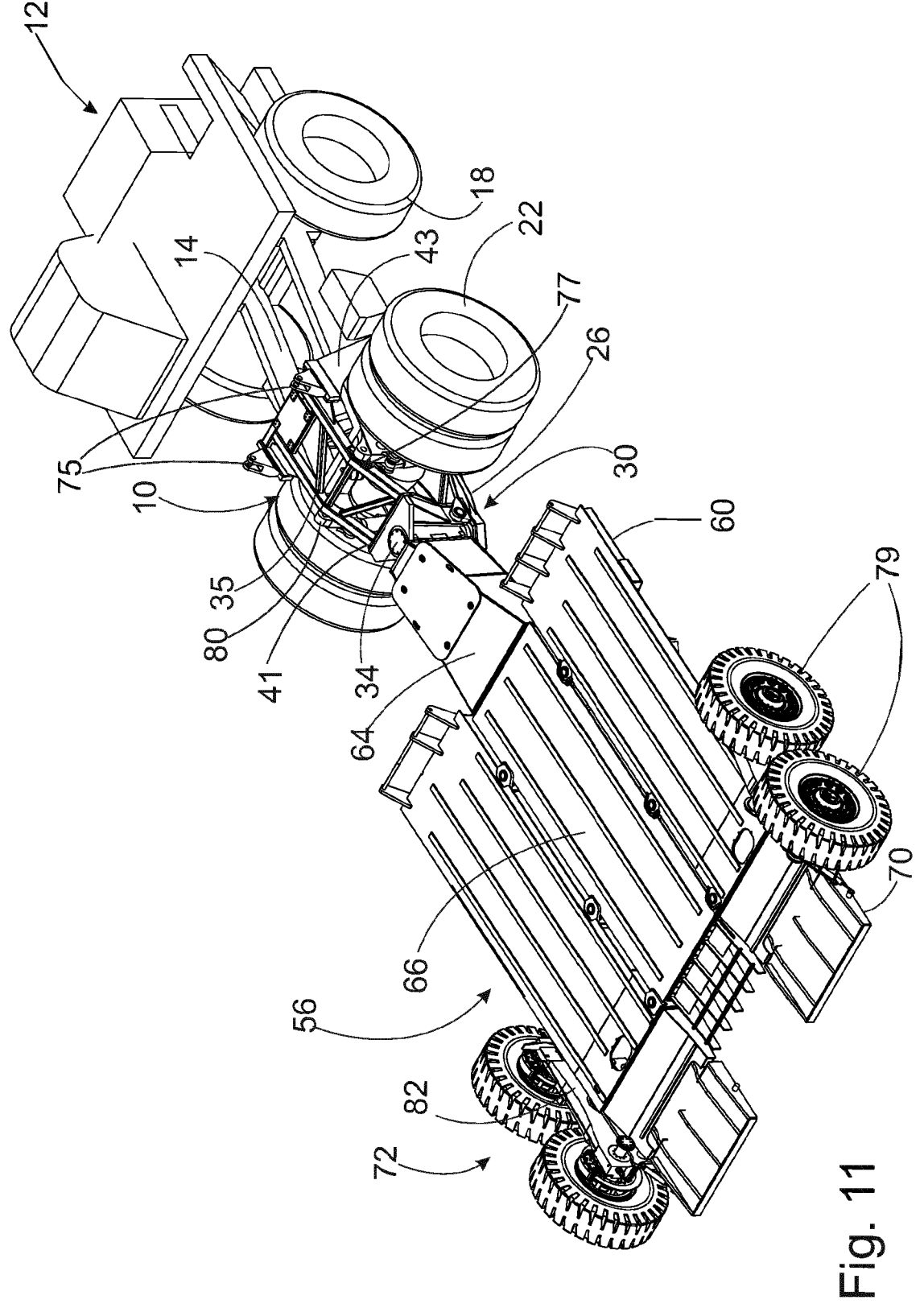
FIG. 11 shows an axonometric angled rear view of a second embodiment of the system according to the invention.
Figures 12A, 12B:
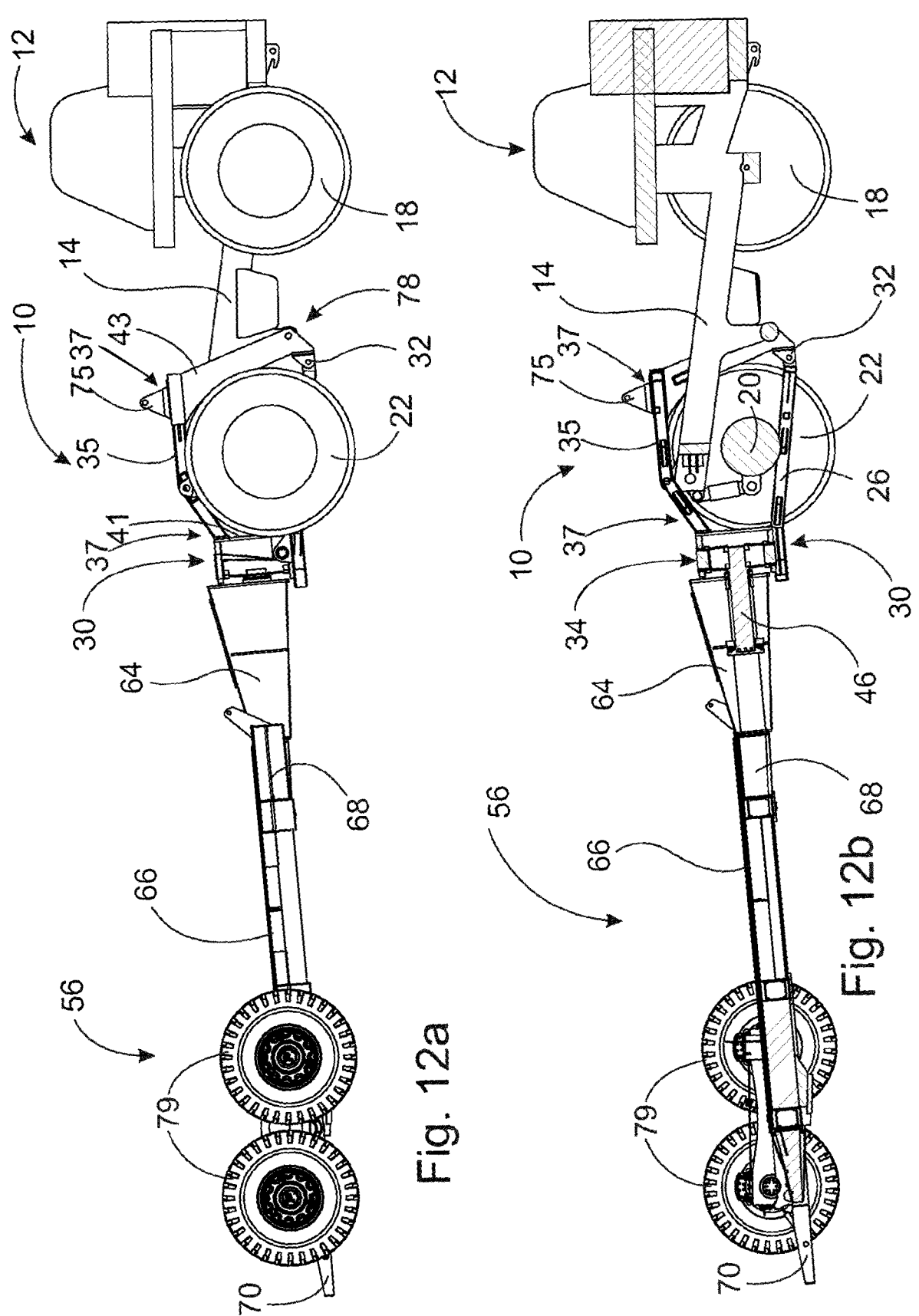
FIG. 12a shows a side view of a second embodiment of the system according to the invention.
FIG. 12b shows a side cross-section of a second embodiment of the system according to the invention.
Figure 13:
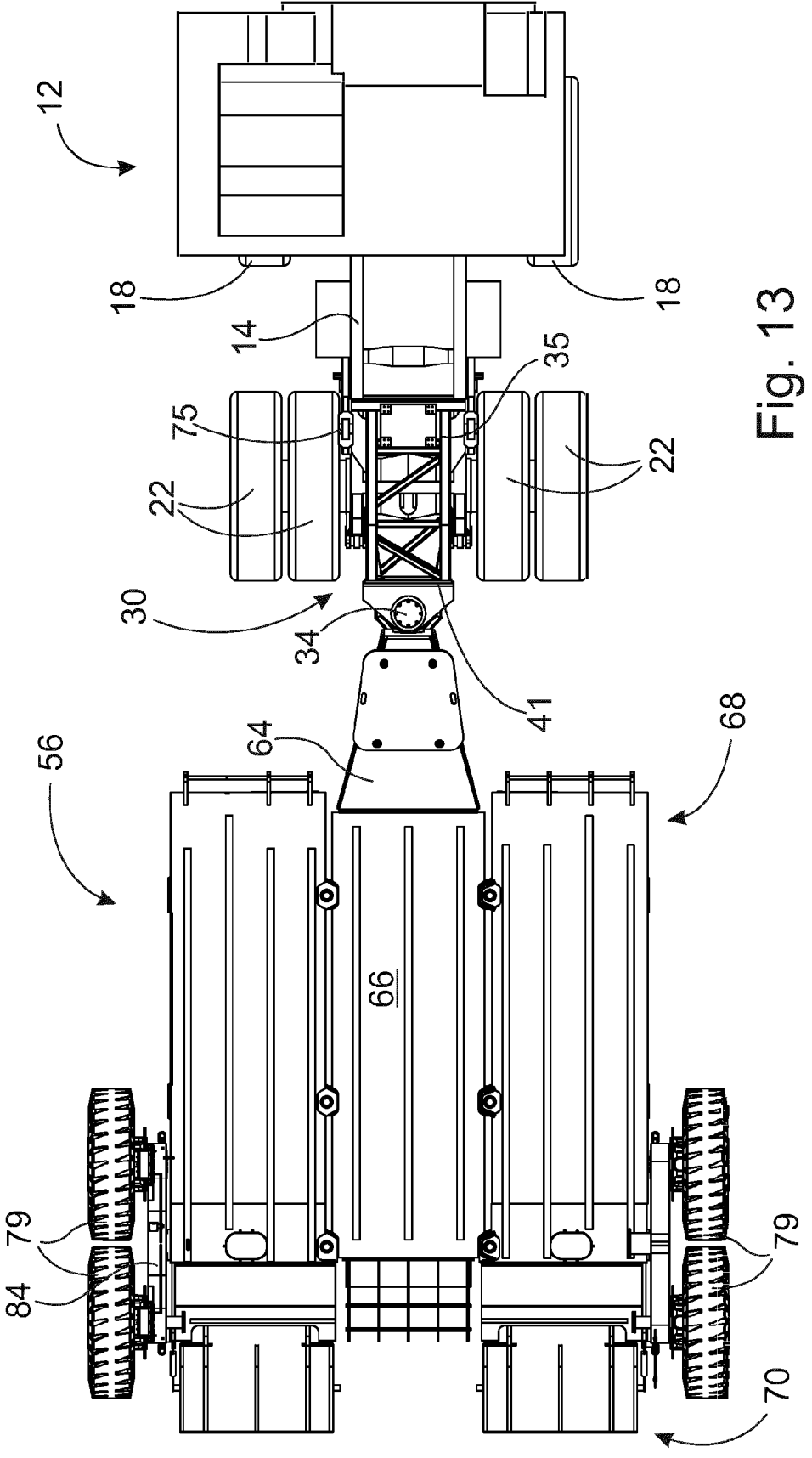
FIG. 13 shows a top view of a second embodiment of the system according to the invention.
Figure 14:
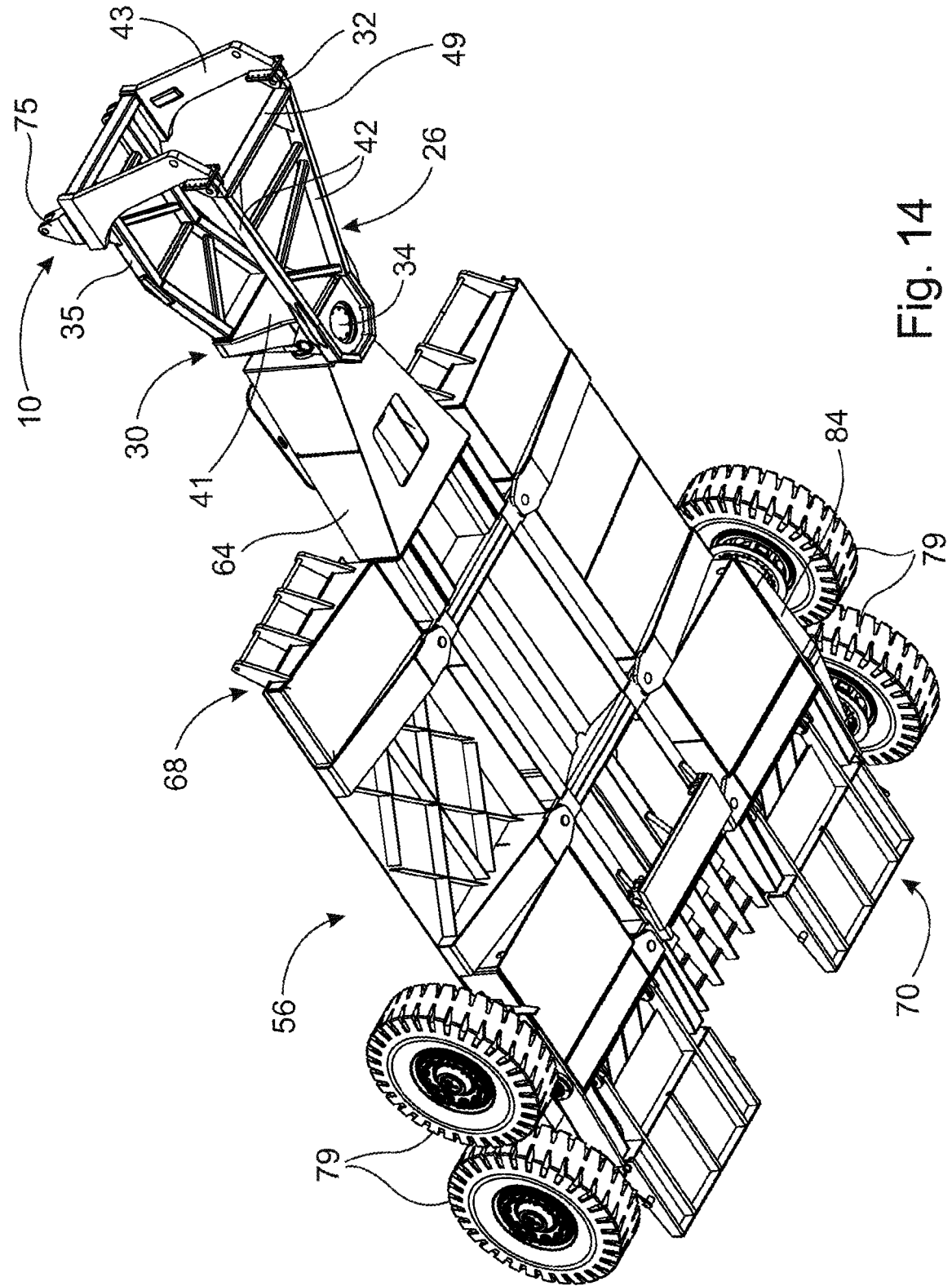
FIG. 14 shows an angled bottom view of a second embodiment of the trailer and towing arrangement of the system according to the invention.

Seen from the side, the upper drawbar 35 can have a curved shape and can comprise two sub-arms attached to each other, which attach the vertical support 41 preferably to the earth-moving vehicle's 12 chassis' 14 tipper-body pivot points 80 and, according to FIG. 11, are supported laterally from the support surface 77 on the earth-moving vehicle's 12 chassis 14, for example to the tipper body's pivot points 80. Lateral support is important, because, when the trailer turns, strong torsions act on the upper drawbar 35. The drawbar 26 in turn can comprise adjacent arms 42, which are joined together with the aid of transverse supports 49.

According to FIGS. 18-20, the second embodiment too of the towing arrangement 10 can be used when towing another earth-moving vehicle 12. A chassis attachment 122, with the aid of lugs 124 belonging to which the other earth-moving vehicle to be towed is then attached to the towing arrangement's 10 third pivot 44 by its chassis and the towing arrangement 10. In the towing arrangement of the system according to the invention, in connection with the towing of another earth-moving vehicle there is no need to use additional weights on the front of the towing earth-moving vehicle, because the towing point is formed in front of the towing earth-moving vehicle's rear axle. In systems according to the prior art, the towing point is formed well behind the towing earth-moving vehicle's rear axle, when the weight of the earth-moving vehicle being towed has tended to lift the towing earth-moving vehicle's front wheels into the air, which has been compensated by the use of additional weight. According to FIG. 18, the lifting cylinder 116 can be pivoted to between the tipper body's pivot point 80 and the lifting cylinder's upper pivot 75, thus permitting the drawbar's towing point 30 to be raised and lowered, as well as increasing the weight on the towing earth-moving vehicle's 12 rear wheels 22 by pressing using the lifting cylinder 116.

The dimensioning of the trailer of the system according to the invention depends strongly on the weight of the work machine being transported. If it is wished to transport work machine weighing 120 tn on the trailer, the wheels using in the trailer must have a diameter of at least 1.6 m. The trailer can be 10-25-m, preferably 15-20-m long, and 4-12-m, preferably 6-10-m wide. The towing arrangement can be manufactured from, for example, 10-30-mm steel plate, and its other dimensions depend on the dimensioning of the earth-moving vehicle to be used.

The invention claimed is:

1. A system for moving a work machine equipped with a crawler chassis or a wheeled chassis, the system comprising a towing vehicle, a trailer arranged to be towed with the towing vehicle, and a towing arrangement for the towing vehicle, wherein:

the towing vehicle comprises:
  a vehicle chassis;
  a front axle with front wheels and a rear axle with rear wheels arranged in the vehicle chassis at a distance from each other; and
  a towing vehicle's towing point arranged under the vehicle chassis between the front axle and the rear axle;

the trailer comprises:
  a trailer chassis comprising sides, a towing end and a loading end, and a towing arm at the towing end;
  an essentially level deck comprising a front end and a rear end, fitted on top of the trailer chassis; and
  wheels fitted on both sides of the trailer chassis at sides of the deck; and the towing arrangement comprises:

a drawbar comprising: a first end pivoted to the towing vehicle's towing point and a second end having a drawbar's towing point for a pivoted connection with the towing arm of the trailer for towing the trailer, wherein the drawbar is arranged essentially parallel to the vehicle chassis and extends in a forward direction of the towing vehicle from the second end of the drawbar behind the vehicle's rear axle to a front side of the towing vehicle's rear axle;

a first pivot having an axis in a transverse direction of the vehicle chassis for pivoting the drawbar under the rear axle to the towing vehicle's towing point formed under the vehicle chassis;

a second pivot having a vertical axis fitted to the drawbar's second end and being arranged to rigidly transmit a load of the trailer being towed to the first pivot;

a third pivot, located at one of the first and second ends of the drawbar and equipped with a shaft in a longitudinal direction of the towing vehicle to permit the trailer to tilt in a transverse direction of the towing vehicle, wherein the towing arm of the trailer is rigidly attachable to the drawbar's second pivot;

a vertical support attached to the drawbar and arranged to support the second pivot;

an upper drawbar comprising two ends and attached at one of the two ends to the vertical support and at the other one of the two ends to the vehicle chassis; and a connector arm connecting the upper drawbar to the towing vehicle's towing point by running over the rear axle, wherein the drawbar, the upper drawbar, and the connector arm form a closed structure surrounding the rear axle.

2. The system according to claim 1, wherein the third pivot is formed in the vertical support on a rear side of the towing vehicle's rear axle.

3. The system according to claim 1, wherein the towing arrangement further includes a chassis support connected to an attachment end of a support arm, which is arranged to be attached on top of the towing vehicle's chassis.

4. The system according to claim 1, wherein the towing vehicle is an earthmoving vehicle, which includes tipping-cylinder lugs attached to an under-surface of the towing vehicle chassis and the towing vehicle's towing point is formed in the tipping-cylinder lugs.

5. The system according to claim 4, wherein the earth-moving vehicle acting as the towing vehicle comprises tipper-body pivot points located in the towing vehicle chassis and the upper drawbar is attached to the tipper body's pivot points.

6. The system according to claim 4, wherein the trailer comprises, in addition, swing bogies to connect the wheels to the trailer chassis, which swing bogies are arranged on both sides of the trailer chassis, at sides of the deck, and each of the trailer's swing bogies includes:

an eccentric arm comprising a first end pivoted to the trailer chassis and a second end;

an operating device having a first end and a second end pivoted from the first end to the trailer chassis and from the second end to between the eccentric arm's first end and second end;

a swing arm pivoted to the eccentric arm's second end, comprising two ends, on each of which ends one said wheel is mounted in bearings;

wherein the eccentric arm is arranged to lower the deck's rear end onto the ground, the front end remaining essentially in place.

7. The system according to claim 1, wherein the towing arm has attachment equipment for coupling the trailer rigidly to the second pivot, permitting only rotational movement around the vertical axis of the second pivot.

8. A system for towing a work machine equipped with a crawler chassis or a wheeled chassis, the system comprising a towing vehicle, and a towing arrangement for the towing vehicle, wherein the work machine to be towed is an earth-moving vehicle, and wherein:

the towing vehicle comprises:

a towing vehicle chassis;

a front axle with front wheels and a rear axle with rear wheels, arranged in the towing vehicle chassis at a distance from each other; and a towing vehicle's towing point arranged under the towing vehicle chassis between the front axle and rear axle; and the towing arrangement comprises:

a drawbar comprising a first end pivoted to the towing vehicle's towing point and a second end having a drawbar's towing point for the earth moving vehicle to be towed, wherein the drawbar is arranged essentially parallel to the towing vehicle chassis with the second of the drawbar extending to a rear of the towing vehicle's rear axle;

a first pivot for pivoting the drawbar under the rear axle to the towing vehicle's towing point, wherein the first pivot extends in a transverse direction of the towing vehicle chassis;

a second pivot fitted to the drawbar's second end, wherein the second pivot is vertical and arranged to transmit a load of the earth-moving vehicle to be towed rigidly to the first pivot;

a third pivot, located at the second end of the drawbar extending in a vertical direction and equipped with a shaft extending in a longitudinal direction of the towing vehicle, to permit the earth moving vehicle to be towed to tilt in a direction transverse to a longitudinal direction of the towing vehicle, wherein a towing arm of the earth moving vehicle to be towed is rigidly attached to the drawbar's third pivot;

a vertical support to support the third pivot and attached to the drawbar;

an upper drawbar comprising two ends with one of the two ends attached to the vertical support and another end attached to the towing vehicle chassis; and a connector arm connecting the upper drawbar to the towing vehicle's towing point by running over the rear axle, wherein the drawbar, the upper drawbar, and the connector arm form a closed structure surrounding the rear axle;

a chassis attachment having lugs for attaching the earth-moving vehicle to the towing arrangement's third pivot; and a lifting cylinder for raising and lowering the drawbar's towing point.

* * * * *